US010554131B2

(12) United States Patent
Yoshida et al.

(10) Patent No.: US 10,554,131 B2
(45) Date of Patent: Feb. 4, 2020

(54) POWER SUPPLY UNIT HAVING A TRANSFORMER WITH A PRIMARY WINDING AND A SECONDARY WINDING FOR SUPPLYING A VOLTAGE

(71) Applicant: FUJI XEROX CO., LTD., Tokyo (JP)

(72) Inventors: Takayuki Yoshida, Kanagawa (JP); Hajime Misumi, Kanagawa (JP); Tsutomu Taji, Kanagawa (JP); Norio Hasegawa, Kanagawa (JP); Hyeonju Kim, Kanagawa (JP); Takashi Fujii, Kanagawa (JP); Hideyuki Akiba, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/583,391

(22) Filed: May 1, 2017

(65) Prior Publication Data
US 2018/0183341 A1 Jun. 28, 2018

(30) Foreign Application Priority Data
Dec. 22, 2016 (JP) ................................. 2016-250150

(51) Int. Cl.
*H02M 3/335* (2006.01)
*G03G 15/00* (2006.01)
*H02M 1/10* (2006.01)

(52) U.S. Cl.
CPC ........ *H02M 3/33507* (2013.01); *G03G 15/80* (2013.01); *H02M 1/10* (2013.01); *H02M 3/335* (2013.01)

(58) Field of Classification Search
CPC ................................ H02M 1/10; H02M 3/335
See application file for complete search history.

(56) References Cited

U.S. PATENT DOCUMENTS 5,781,071 A * 7/1998 Kusunoki ........... H01F 27/2804
330/269
6,531,998 B1 * 3/2003 Gordon .................. G05G 9/047
345/156

(Continued)

FOREIGN PATENT DOCUMENTS

JP 2015-109782 A 6/2015

*Primary Examiner* — Yusef A Ahmed
*Assistant Examiner* — Ishrat F Jamali
(74) *Attorney, Agent, or Firm* — Sughrue Mion, PLLC

(57) ABSTRACT

A power supply unit includes primary and secondary circuits and a transformer. The primary circuit is connected to an alternating-current power supply and includes a switching device. The transformer includes primary and secondary windings. The primary winding receives an alternating current so that an alternating current is induced in the secondary winding. The received alternating current is generated through switching using the switching device. The secondary circuit rectifies, for output, the alternating current induced in the secondary winding. The primary winding includes first and second windings. When the alternating-current power supply is a power supply of a first voltage, the first winding is connected to the second winding in parallel in the primary winding. When the alternating-current power supply is a power supply of a second voltage higher than the first voltage, the first winding is connected to the second winding in series in the primary winding.

16 Claims, 12 Drawing Sheets

(56) References Cited

U.S. PATENT DOCUMENTS

| | | | | |
|---|---|---|---|---|
| 2008/0258703 A1* | 10/2008 | Makino | ............... | H02M 5/12 |
| | | | | 323/355 |
| 2011/0222319 A1* | 9/2011 | Marumo | ........... | H02M 3/33507 |
| | | | | 363/21.12 |
| 2014/0346867 A1* | 11/2014 | Pini | ................ | H02M 1/10 |
| | | | | 307/17 |

* cited by examiner

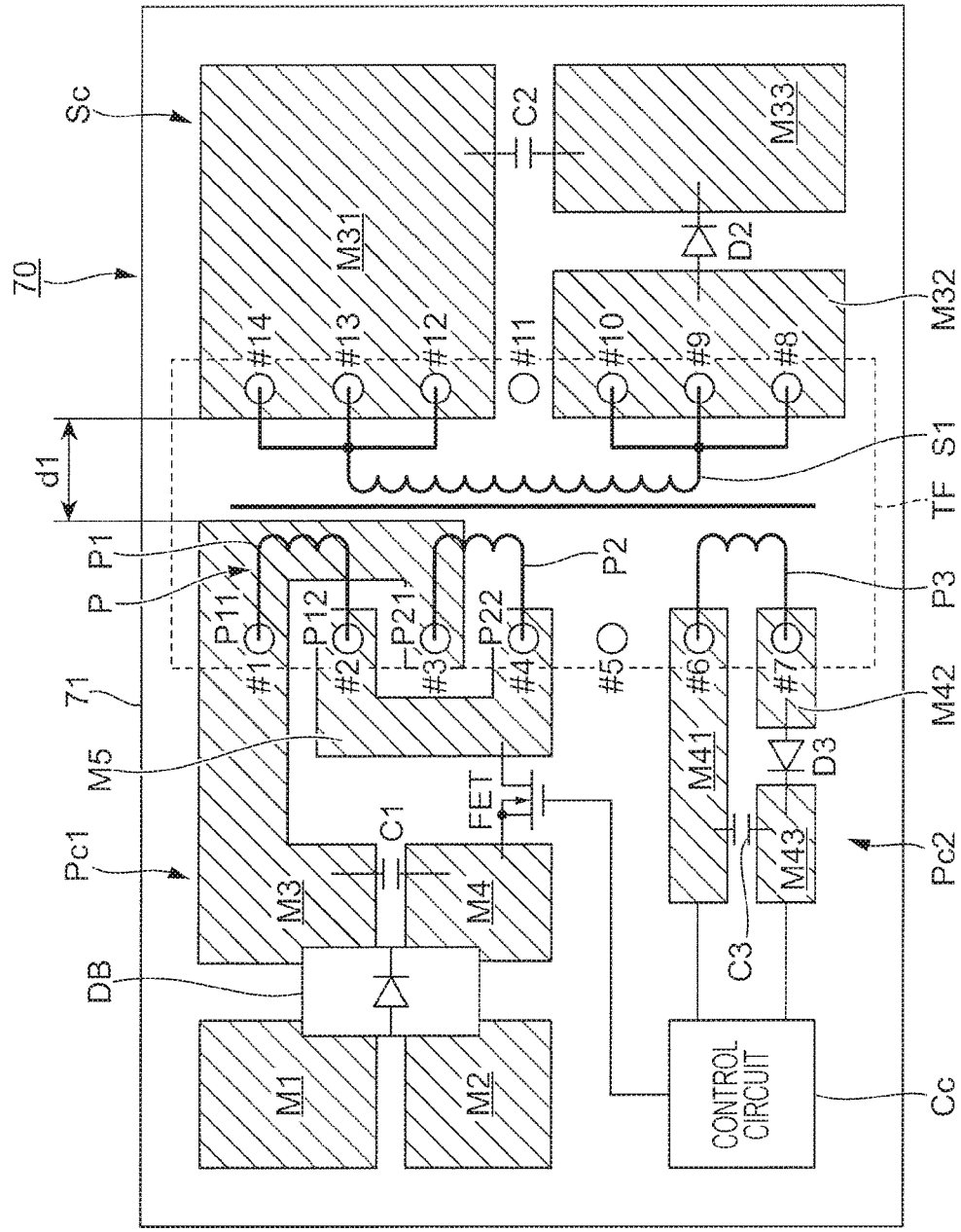

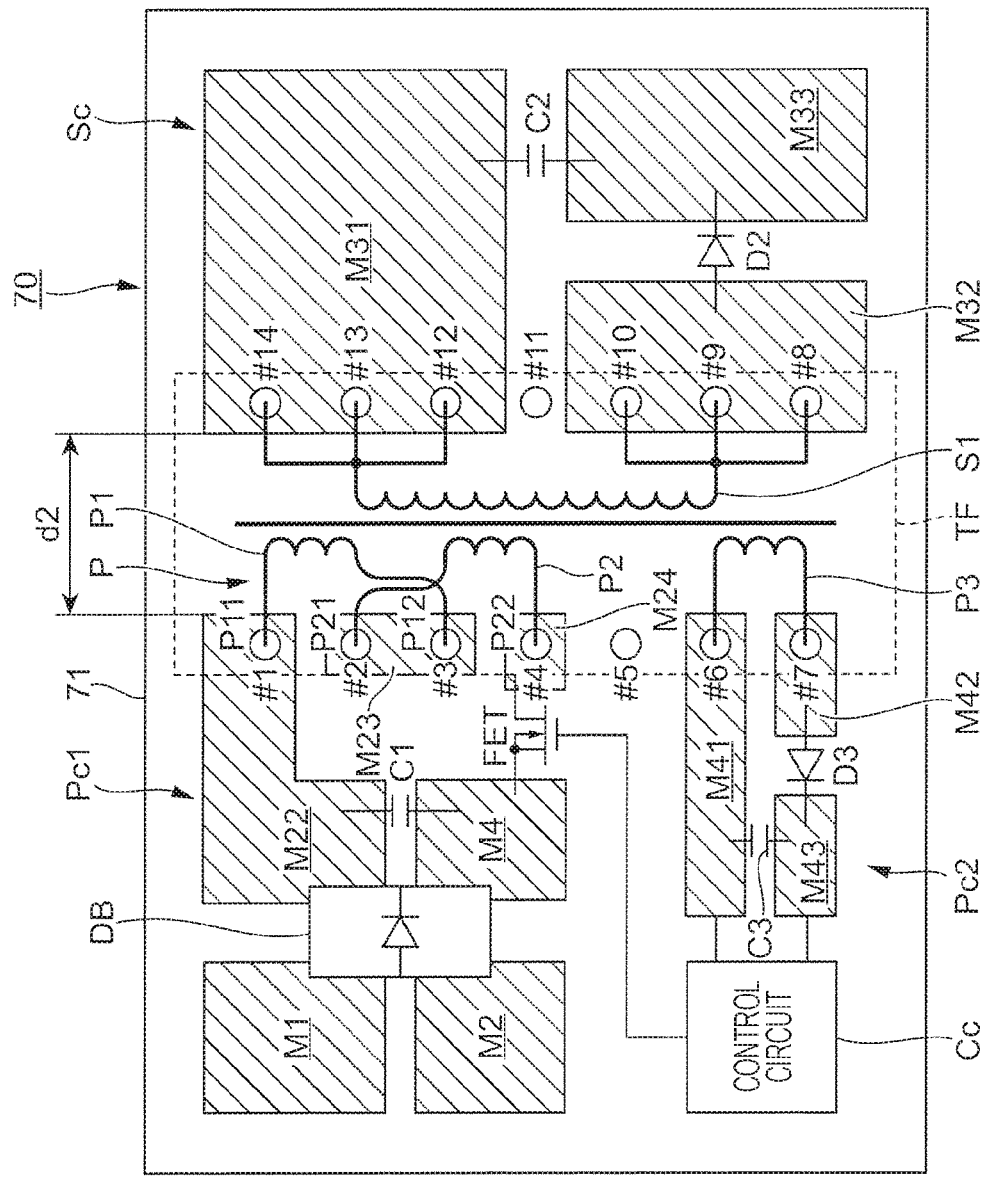

POWER SUPPLY UNIT HAVING A TRANSFORMER WITH A PRIMARY WINDING AND A SECONDARY WINDING FOR SUPPLYING A VOLTAGE

CROSS-REFERENCE TO RELATED APPLICATIONS

This application is based on and claims priority under 35 USC 119 from Japanese Patent Application No. 2016-250150 filed Dec. 22, 2016.

BACKGROUND

(i) Technical Field

The present invention relates to a power supply unit.

(ii) Related Art

A power supply unit supplying a predetermined voltage is formed by using a transformer corresponding to the voltage supplied from a commercial power supply.

SUMMARY

According to an aspect of the invention, there is provided a power supply unit including a primary circuit, a transformer, and a secondary circuit. The primary circuit is connected to an alternating-current power supply and includes a switching device. The transformer includes a primary winding and a secondary winding. The primary winding receives an alternating current in such a manner that an alternating current is induced in the secondary winding. The received alternating current is generated through switching using the switching device. The secondary circuit rectifies, for output, the alternating current induced in the secondary winding. The primary winding includes a first winding and a second winding. When the alternating-current power supply is a power supply of a first voltage, the first winding is connected to the second winding in parallel in the primary winding. When the alternating-current power supply is a power supply of a second voltage higher than the first voltage, the first winding is connected to the second winding in series in the primary winding.

BRIEF DESCRIPTION OF THE DRAWINGS

Exemplary embodiments of the present invention will be described in detail based on the following figures, wherein:

FIG. 3A is a diagram illustrating an exemplary configuration of a low-voltage power supply unit to which the first exemplary embodiment is applied;

FIG. 6B is a diagram illustrating an exemplary configuration of a high-voltage power supply unit to which the fourth exemplary embodiment is applied;

DETAILED DESCRIPTION

Exemplary embodiments of the present invention will be described below with reference to the attached drawings.

First Embodiment

Image Forming Apparatus 1

Figure 1:
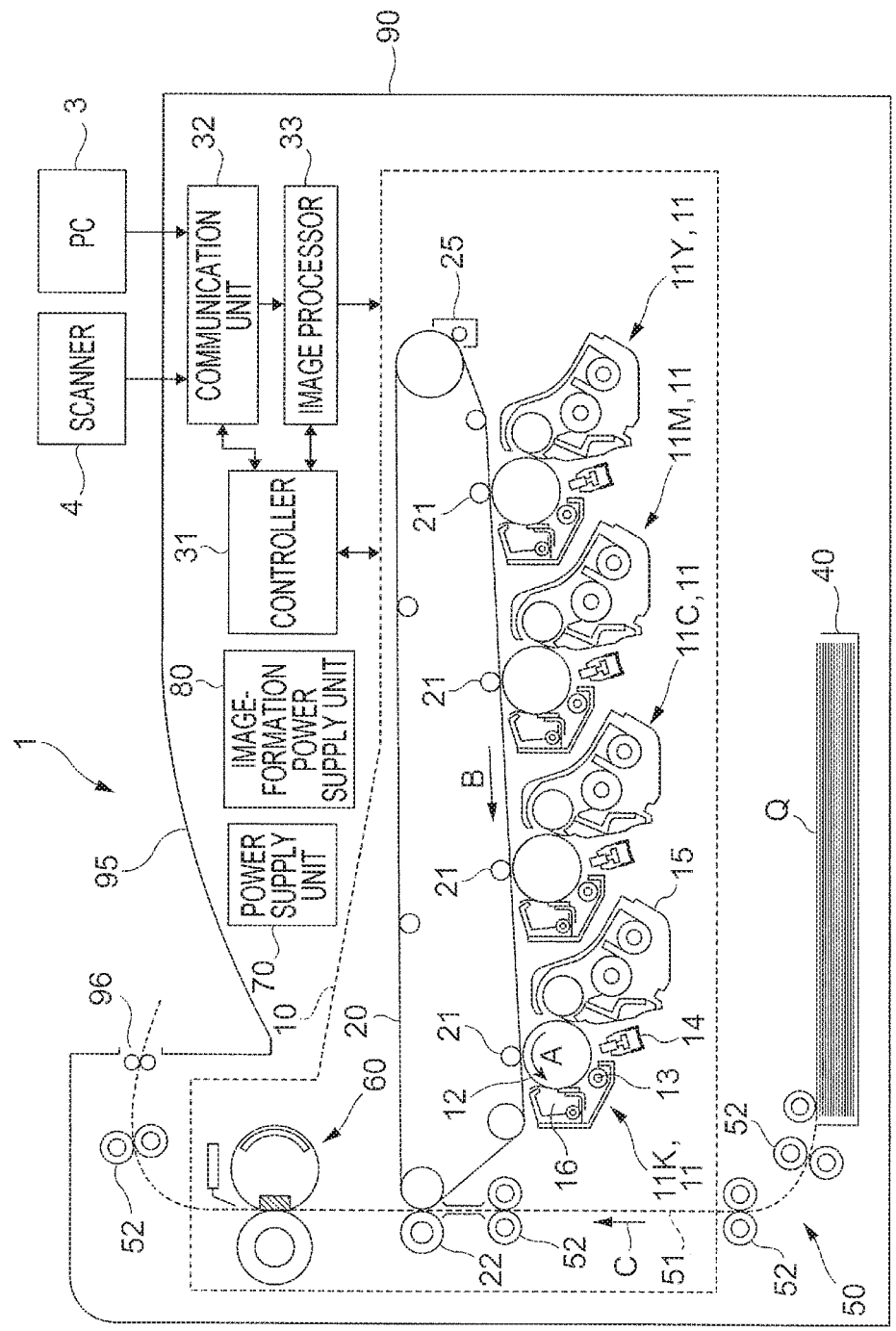
FIG. 1 is a schematic sectional view of an image forming apparatus.

FIG. 1 is a schematic sectional view of an image forming apparatus 1. The illustrated image forming apparatus 1 is an electrophotographic color printer that prints an image on the basis of image data.

The image forming apparatus 1 includes, within a body case 90, a sheet accommodating unit 40 in which sheets Q are accommodated, an image forming unit 10 that forms an image on a sheet Q, and a conveying unit 50 that conveys a sheet Q from the sheet accommodating unit 40 through the image forming unit 10 to a sheet eject portion 96 of the body case 90. The image forming apparatus 1 also includes a controller 31 that controls the entire operations of the image forming apparatus 1, a communication unit 32 that communicates, for example, with a personal computer (PC) 3, an image reading apparatus (scanner) 4, and the like and that receives image data, and an image processor 33 that performs image processing on image data received by the communication unit 32. The image forming apparatus 1 further includes an image-formation power supply unit 80 for supplying high-voltage power to the image forming unit 10. The image forming apparatus 1 furthermore includes a power supply unit 70 that receives an alternating current from a commercial power supply and that supplies direct-current power to the image-formation power supply unit 80, the controller 31, the communication unit 32, and the image processor 33. The power supply unit 70 serves as an exemplary power supply unit.

The sheet accommodating unit 40 contains the sheets Q.

The conveying unit 50 includes a transport path 51 for a sheet Q and conveying rollers 52. The transport path 51 extends from the sheet accommodating unit 40 through the image forming unit 10 to the sheet eject portion 96. The conveying rollers 52 convey a sheet Q along the transport path 51. The conveying unit 50 conveys a sheet Q in the arrow C direction.

The image forming unit 10 includes four image forming units 11Y, 11M, 11C, and 11K that are disposed at predetermined intervals. Hereinafter, when the image forming units 11Y, 11M, 11C, and 11K are not distinguished from one another, the image forming units 11Y, 11M, 11C, and 11K are denoted as image forming units 11. Each image forming unit 11 includes a photoconductor drum 12, a charger 13, a light emitting diode (LED) print head 14, a developing unit 15, and a drum cleaner 16. The photoconductor drum 12 forms an electrostatic latent image and holds a toner image. The charger 13 charges the surface of the photoconductor drum 12 with a predetermined potential. The LED print head 14 exposes the photoconductor drum 12 charged by the charger 13, to light on the basis of image data of the corresponding color. The developing unit 15 develops an electrostatic latent image formed on the surface of the photoconductor drum 12. The drum cleaner 16 cleans the surface of the photoconductor drum 12 after transfer.

The four image forming units 11Y, 11M, 11C, and 11K have similar configurations except toner contained in the developing unit 15, and the image forming unit 11Y including the developing unit 15 containing yellow (Y) toner forms a yellow toner image. Similarly, the image forming unit 11M including the developing unit 15 containing magenta (M) toner forms a magenta toner image; the image forming unit 11C including the developing unit 15 containing cyan (C) toner forms a cyan toner image; and the image forming unit 11K including the developing unit 15 containing black (K) toner forms a black toner image.

The image forming unit 10 includes an intermediate transfer belt 20 and first transfer rollers 21. On the intermediate transfer belt 20, the color toner images formed on the photoconductor drums 12 of the image forming units 11 are transferred on top of one another so as to be superimposed on one another. The first transfer rollers 21 sequentially performs electrostatic transfer (first transfer) onto the intermediate transfer belt 20, on the color toner images formed by the image forming units 11. Further, the image forming unit 10 includes a second transfer roller 22 and a fixing unit 60. The second transfer roller 22 performs electrostatic transfer (second transfer) onto a sheet Q at a time, on the superimposed toner images obtained by transferring the color toner images onto the surface of the intermediate transfer belt 20 in a superimposed manner. The fixing unit 60 fixes the superimposed toner images that have been subjected to second transfer onto the sheet Q.

The image forming apparatus 1 performs an image forming process through the following processes under operation control exerted by the controller 31. That is, image data transmitted from the PC 3 or the scanner 4 is received by the communication unit 32. After the image processor 33 performs predetermined image processing on the image data, the image data is converted into image data of each color which is transmitted to the image forming unit 11 for the corresponding color. For example, in the image forming unit 11K that forms a black toner image, while rotating in the arrow A direction, the photoconductor drum 12 is charged at a predetermined potential by the charger 13.

After that, the print head 14 scans and exposes, to light, the photoconductor drum 12 on the basis of black image data transmitted from the image processor 33. Thus, an electrostatic latent image corresponding to the black image data is formed on the surface of the photoconductor drum 12. The black electrostatic latent image formed on the photoconductor drum 12 is developed by the developing unit 15, and a black toner image is formed on the photoconductor drum 12. Similarly, the image forming units 11Y, 11M, and 11C form toner images of yellow (Y), magenta (M), and cyan (C), respectively.

The first transfer rollers 21 are used to sequentially perform electrostatic transfer on the color toner images formed on the photoconductor drums 12 of the image forming units 11, onto the intermediate transfer belt 20 that moves in the arrow B direction, and the superimposed toner images obtained by superimposing the color toner images are formed on the intermediate transfer belt 20.

The intermediate transfer belt 20 moves in the arrow B direction so that the superimposed toner images on the intermediate transfer belt 20 are conveyed to the second transfer roller 22. At the timing at which the superimposed toner images are conveyed to the second transfer roller 22, the conveying rollers 52 of the conveying unit 50 convey a sheet Q from the sheet accommodating unit 40 in the arrow C direction along the transport path 51. The superimposed toner images formed on the intermediate transfer belt 20 are subjected to electrostatic transfer at a time onto the sheet Q conveyed along the transport path 51, due to a transfer electric field formed by the second transfer roller 22.

After that, the sheet Q onto which electrostatic transfer has been performed on the superimposed toner images is conveyed to the fixing unit 60 along the transport path 51. The fixing unit 60 applies heating and pressure to fix, onto the sheet Q, the superimposed toner images on the sheet Q which have been conveyed to the fixing unit 60. The sheet Q on which the fixed superimposed toner images are formed is conveyed in the arrow C direction along the transport path 51, and is ejected from the sheet eject portion 96 of the body case 90. Then, the sheet Q is loaded on the sheet loading unit 95 on which sheets are to be put.

In contrast, remaining toner on the photoconductor drums 12 after first transfer and remaining toner on the intermediate transfer belt 20 after second transfer are removed by the drum cleaners 16 and a belt cleaner 25, respectively.

The process of the image forming apparatus 1 printing an image on a sheet Q is repeatedly performed in cycles, the number of which corresponds to the number of copies.

Power Supply Unit 70

The power supply unit 70 receives an alternating current from a commercial power supply (alternating-current power supply), supplies, for example, a direct current of 24 V to the image-formation power supply unit 80, and supplies, for example, a direct current of 5 V to the controller 31, the communication unit 32, and the image processor 33.

There are a low-voltage system (90V to 140V) and a high-voltage system (196V to 264V) as the voltage of a commercial power supply. Therefore, the image forming apparatus 1 includes the power supply unit 70 corresponding to the voltage of a commercial power supply from which power is received (supplied).

The power supply unit 70 uses a switching regulator system using a switching device. A transformer TF is used for the voltage conversion.

Figure 2B:
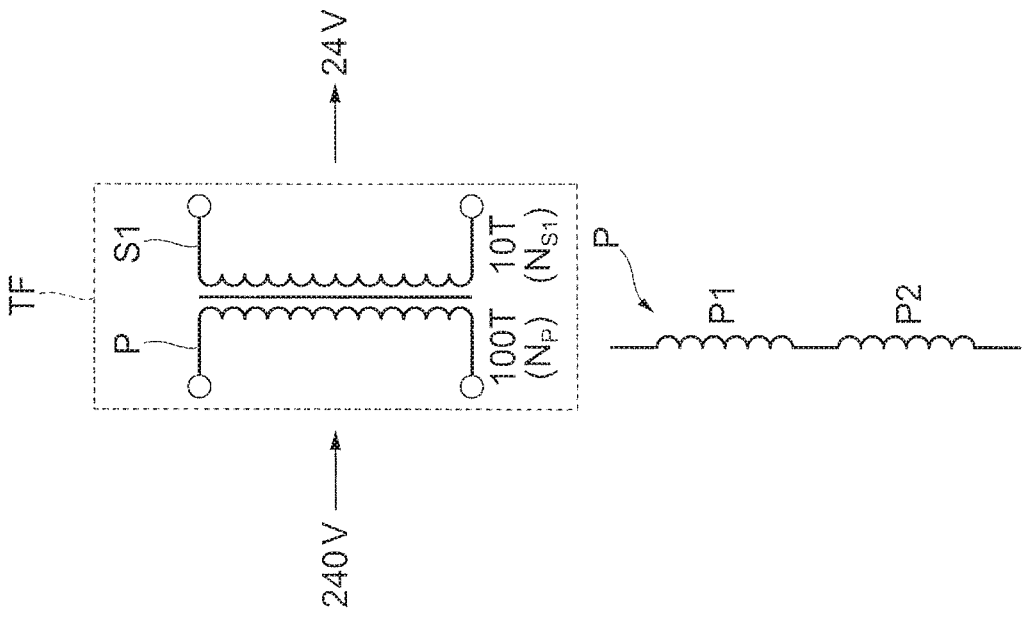
FIG. 2B is a diagram for describing an overview of a transformer in a power supply unit to which the first exemplary embodiment is applied and which receives high-voltage alternating current.
Figure 2A:
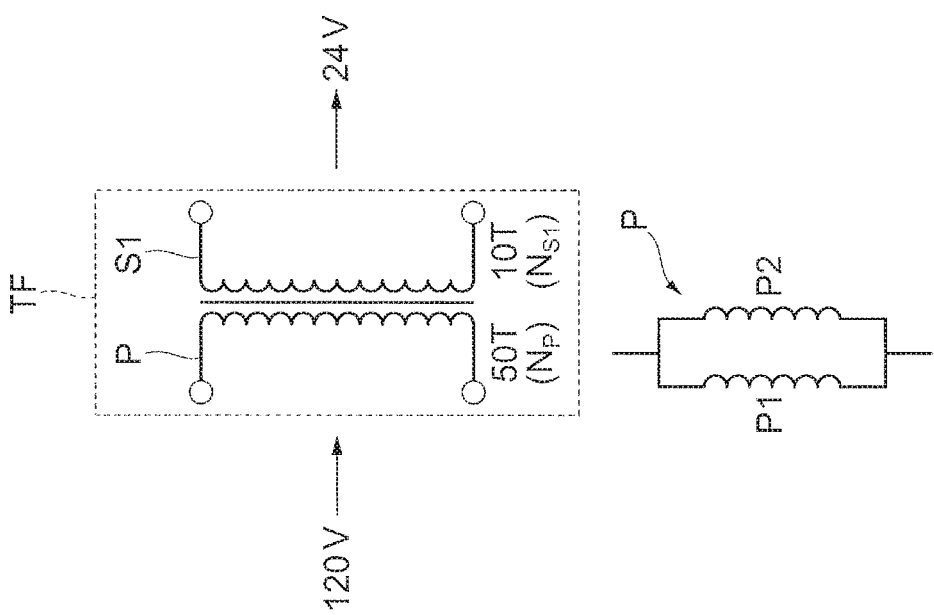
FIG. 2A is a diagram for describing an overview of a transformer in a power supply unit to which a first exemplary embodiment is applied and which receives low-voltage alternating current.

FIGS. 2A and 2B are diagrams for describing an overview of the transformer TF in the power supply unit 70 to which the first exemplary embodiment is applied. FIG. 2A illustrates a case in which a low-voltage alternating current is received, and FIG. 2B illustrates a case in which a high-voltage alternating current is received. In FIGS. 2A and 2B, a low-voltage system of, for example, 120 V, and a high-voltage system of, for example, 240 V are illustrated. In addition, in each of the upper portions of FIGS. 2A and 2B, the relationship of winding numbers in the transformer TF is illustrated, and, in each of the lower portions, the configuration of a primary winding P is illustrated.

In the description below, a case in which a low-voltage alternating current is received is denoted as a case of a low-voltage system, and a case in which a high-voltage alternating current is received is denoted as a case of a high-voltage system.

As illustrated in the upper portion in FIG. 2A, in the case of a low-voltage system (in this example, 120 V), the winding number $N_P$ of the primary winding P of the transformer TF is 50 turns (T), and the winding number $N_{S1}$ of a secondary winding S1 is 10 T. Accordingly, 24 V is obtained from 120 V.

In contrast, as illustrated in the upper portion in FIG. 2B, in the case of a high-voltage system (in this example, 240 V) (hereinafter denoted as the case of a high-voltage system), the winding number $N_P$ of the primary winding P of the transformer TF is 100 T, and the winding number $N_{S1}$ of the secondary winding S1 is 10 T. Thus, 24 V is obtained from 240 V.

That is, in both of the case of a low-voltage system and the case of a high-voltage system, the winding number $N_{S1}$ of the secondary winding S1 is 10 T. However, the winding number $N_P$ of the primary winding P in the case of a low-voltage system, i.e., 50 T, is different from the winding number $N_P$ in the case of a high-voltage system, i.e., 100 T. Therefore, if this configuration is used, it is not possible to commonly use the transformer TF in the low-voltage system and the high-voltage system.

Accordingly, the transformer TF to which the first exemplary embodiment is applied employs a configuration in which the primary winding P is divided into two windings P1 and P2, each of which has a winding number $N_P$ of 50 T. In the case of a low-voltage system, the winding P1 and the winding P2 are connected to each other in parallel. Thus, the winding number $N_P$ of the primary winding P is 50 T. In contrast, in the case of a high-voltage system, the winding P1 and the winding P2 are connected to each other in series. Thus, the winding number $N_P$ of the primary winding P is 100 T.

Each of the windings P1 and P2 is wound so that voltage is generated in the same direction with respect to the secondary winding S1.

This configuration enables many components included in the transformer TF to be commonly used for both of a low-voltage alternating current and a high-voltage alternating current that are received by the image forming apparatus 1. Therefore, it is not necessary to prepare different transformers TF for the image forming apparatus 1 receiving a low-voltage alternating current and the image forming apparatus 1 receiving a high-voltage alternating current, achieving simple management of components and reduction in cost.

In the configuration in which the primary winding P is divided into the winding P1 (having inductance L1 and direct current resistance R1) and the winding P2 (having inductance L2 and direct current resistance R2), the inductance is equal to L1+L2 in the case of series connection, and the inductance is equal to 1/(1/L1+1/L2) in the case of parallel connection. The direct current resistance is equal to 1/(1/R1+1/R2) in the case of parallel connection, and the direct current resistance is equal to R1+R2 in the case of series connection.

Assume that L1=L2=L. The inductance is equal to 2L in the case of series connection, and is equal to L/2 in the case of parallel connection. Assume that R1=R2=R. The direct current resistance is equal to R/2 in the case of parallel connection, and is equal to 2R in the case of series connection. That is, the direct current resistance obtained in the case of a low-voltage system is a quarter of the direct current resistance of a high-voltage system.

The loss (heating value) produced due to the direct current resistance of the primary winding P is proportional to the multiplication product of the square of a current and the direct current resistance. Therefore, when the same power is to be supplied to the secondary winding S1 (24 V side), the current in the low-voltage system that is twice the current in the high-voltage system needs to flow. However, since the direct current resistance in the low-voltage system is a quarter of the direct current resistance in the high-voltage system, the loss (heating value) is the same.

In the case of a low-voltage system, even when one of the winding P1 and the winding P2 of the primary winding P is used, 24 V may be obtained from the low-voltage system (120 V). However, the direct current resistance obtained in the case of a low-voltage system is equal to R and is half the direct current resistance obtained in the case of a high-voltage system.

Therefore, when the same amount of power is to be applied to the secondary winding S1 (24 V side), the loss (heating value) in the primary winding P in the low-voltage system is twice the loss in the high-voltage system.

Table 1 describes an exemplary configuration of the transformer to which the first exemplary embodiment is applied. The primary winding P is divided into the two windings P1 and P2. Table 1 describes the winding numbers $N_{P1}$ and $N_{P2}$ and the inductances $L_{P1}$ and $L_{P2}$ for the windings P1 and P2. Further, Table 1 describes the winding number and the inductance of the primary winding P in the low-voltage system and the winding number and the inductance in the high-voltage system, and also describes an exemplary maximum current $I_{PMAX}$ that flows through the primary winding P.

TABLE 1

| Configuration of primary winding P (windings P1 and P2) | | Low-voltage system | High-voltage system |
|---|---|---|---|
| Winding number | $N_{P1}$ | 40 T | 80 T |
|  | $N_{P2}$ | 40 T |  |
| Inductance | $L_{P1}$ | 512 μH | 256 μH | 1024 μH |
|  | $L_{P2}$ | 512 μH |  |
| Maximum current flowing through primary winding P | $I_{PMAX}$ |  | 5.50 A | 2.75 A |

As described in Table 1, the maximum current $I_{PMAX}$ that flows through the primary winding P in the low-voltage system is twice the maximum current $I_{PMAX}$ in the high-voltage system. Accordingly, as the direct current resistance is smaller, the loss (heating value) may be made smaller.

In the description above, the case in which a low-voltage system of 120 V and a high-voltage system of 240 V are used and in which the voltage of the high-voltage alternating current is twice the voltage of the low-voltage alternating current is described. As described above, widely-used commercial power supplies are low-voltage systems of 90 V to 140 V and high-voltage systems of 196 V to 264 V. That is, the voltage of a high-voltage system is approximately twice the voltage of a low-voltage system. Therefore, the first exemplary embodiment may be applied to these voltages.

The low-voltage system serves as an exemplary first voltage, and the high-voltage system serves as an exemplary second voltage. In addition, the low-voltage system is an exemplary 100 V system, and the high-voltage system is an exemplary 200 V system.

The configuration of the power supply unit 70 to which the first exemplary embodiment is applied will be described.

Figure 3B:
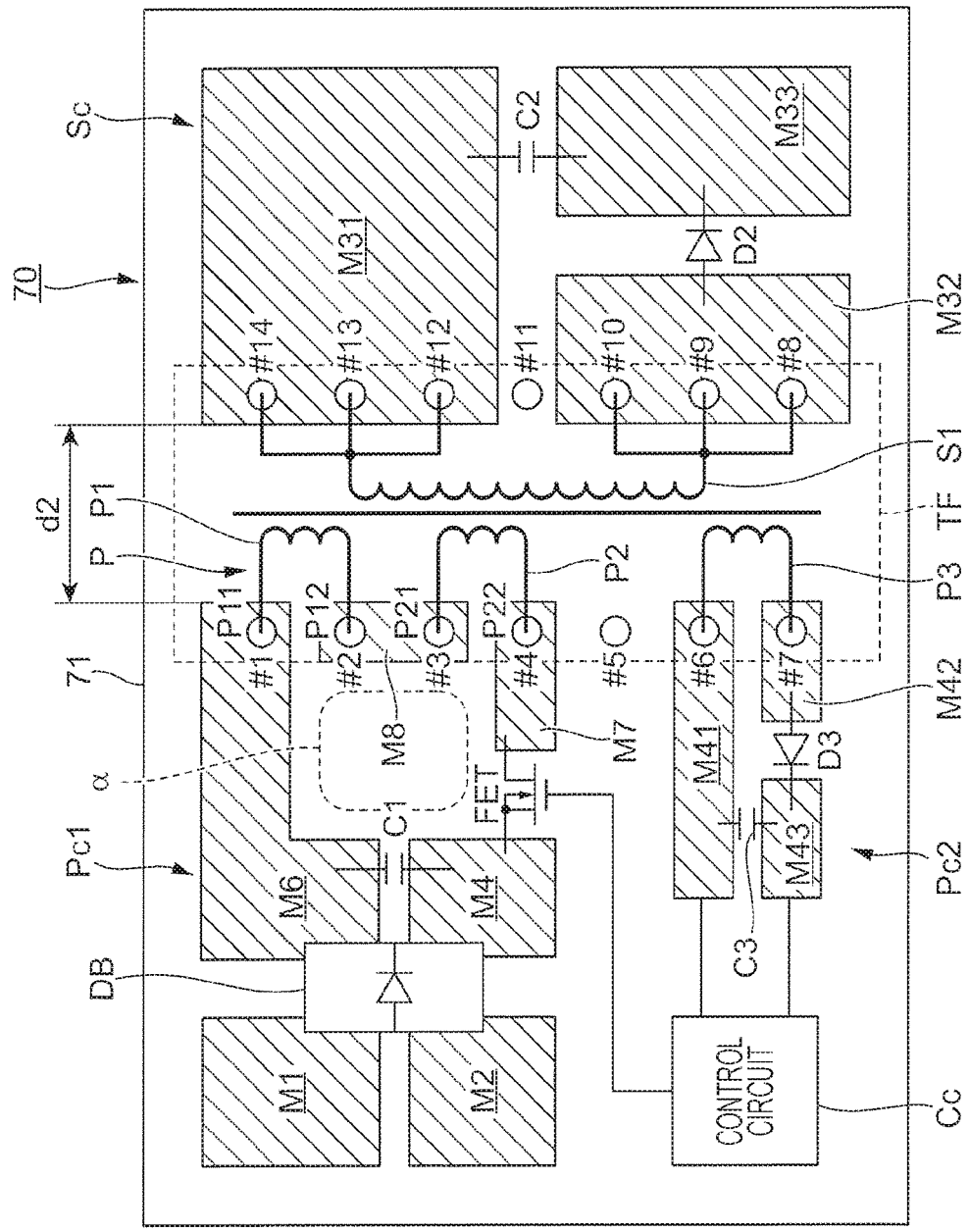
FIG. 3B is a diagram illustrating an exemplary configuration of a high-voltage power supply unit to which the first exemplary embodiment is applied.

FIGS. 3A and 3B illustrate exemplary configurations of the power supply unit 70 to which the first exemplary embodiment is applied. FIG. 3A illustrates a low-voltage power supply unit 70, and FIG. 3B illustrates a high-voltage power supply unit 70. A description will be made under the assumption that the low-voltage system is a system for alternating current of 100 V and the high-voltage system is a system for alternating current of 200 V. Accordingly, the low-voltage system is denoted as 100 V or a low-voltage system (100 V), and the high-voltage system is denoted as 200 V or a high-voltage system (200 V). A description will be made under the assumption that the power supply unit 70 outputs a direct current of 24 V.

The power supply unit 70 includes a power supply substrate 71, electronic components mounted on the power supply substrate 71, and the transformer TF mounted on the power supply substrate 71. The power supply substrate 71 includes an insulated substrate formed of paper-based phenol, glass epoxy, or the like, and multiple pattern conductors M that are formed of copper foil or the like on one of the surfaces of the insulated substrate. Typically, the power supply substrate 71 is formed of a single-layer board having one surface on which a conductor layer such as copper foil is formed. Therefore, the power supply substrate 71 is formed of a single-layer board, and has, on one of the surfaces, the pattern conductors M formed by processing the conductor layer. The power supply substrate 71 may be formed, for example, of a double-sided board having conductor layers formed on both of the surfaces, or a multilayer board including multiple conductor layers.

The size of the power supply substrate 71 of the low-voltage power supply unit 70 is the same as the size of the power supply substrate 71 of the high-voltage power supply unit 70.

When the multiple pattern conductors M are to be distinguished from one another, each of the pattern conductors M is denoted as a pattern conductor Mx. The symbol 'x' indicates a number for identifying the pattern conductor. The same is true for other components.

The electronic components are a diode bridge DB, a field-effect transistor FET, capacitors C1, C2, and C3, and diodes D2 and D3 which are connected to either one of the pattern conductors M.

The transformer TF will be described. As described above, the transformer TF is commonly used in the low-voltage system (FIG. 3A) and the high-voltage system (FIG. 3B).

The transformer TF is formed as an electronic component having 14 pins (pins #1 to #14). The 14 pins are inserted into holes disposed in the power supply substrate 71, and each are connected to a corresponding one of the pattern conductors M. Thus, the transformer TF is electrically connected to pattern conductors M of the power supply substrate 71 through the pins, and is fixed to the power supply substrate 71.

The pins #1 to #14 of the transformer TF are arranged counterclockwise. The pins #1 to #7 and the pins #8 to #14 are arranged in lines so as to face each other.

The transformer TF includes the primary winding P, a primary winding P3, and the secondary winding S1. The primary winding P is divided into the winding P1 and the winding P2. The winding P1 serves as an exemplary first winding, and the winding P2 serves as an exemplary second winding.

Winding end portions (hereinafter denoted as end portions) P11 and P12 of the winding P1 are connected to the pins #1 and #2, respectively. End portions P21 and P22 of the winding P2 are connected to the pins #3 and #4, respectively. The end portion P11 is an exemplary first end portion; the end portion P12 is an exemplary second end portion; the end portion P21 is an exemplary third end portion; and the end portion P22 is an exemplary fourth end portion.

The winding S1 has one end portion that branches so as to be connected to the pins #8 to #10, and has the other end portion that branches so as to be connected to the pins #12 to #14. The end portions branch in order that, for example, concentration of current is avoided. The end portions do not necessarily branch. A winding that connects the pin #8 to the pin #14, a winding that connects the pin #9 to the pin #13, and a winding that connects the pin #10 to pin #12 may be bundled together and used.

The winding P3 has one end portion connected to the pin #6, and has the other end portion connected to the pin #7.

Nothing is connected to the pins #5 and #11.

The transformer TF may have electrodes instead of pins. The surface mounting method is used to connect electrodes to pattern conductors M.

A pin or electrode may be denoted as a terminal. The pins #1 to #7 are exemplary primary terminals. Any configuration may be employed as long as the pins #1 to #7 are arranged in line. The expression "in line" may encompass not only the state in which the pins are arranged in a straight line as illustrated in FIGS. 3A and 3B, but also a state in which the pins are shifted in the direction orthogonal to the straight line. Any configuration may be employed as long as the pins are arranged in line in the order of the pin numbers.

By using FIG. 3A, primary circuits Pc1 and Pc2 and a secondary circuit Sc in the power supply unit 70 of the low-voltage system (100 V) will be described.

The primary circuit Pc1 receives a low-voltage alternating current, and supplies a high-frequency alternating current to the primary winding P of the transformer TF. The secondary circuit Sc rectifies an alternating current induced in the secondary winding S1 of the transformer TF, and generates a direct current of 24 V. The primary circuit Pc2 rectifies an alternating current induced in the primary winding P3 of the transformer TF, and generates a power supply voltage for the control circuit Cc for the field-effect transistor FET which is described below.

The primary circuits Pc1 and Pc2, the secondary circuit Sc, and the transformer TF are formed on the power supply substrate 71.

The primary circuit Pc1 will be described.

The primary circuit Pc1 is formed by using pattern conductors M1, M2, M3, M4, and M5 of the power supply substrate 71. The primary circuit Pc1 includes the diode bridge DB disposed among the pattern conductors M1, M2, M3, and M4. The primary circuit Pc1 also includes the capacitor C1 disposed between the pattern conductors M3 and M4. The primary circuit Pc1 also includes the field-effect transistor FET that serves as a switching device and that is disposed between the pattern conductors M4 and M5.

The pattern conductors M1 and M2 receive an alternating current of 100 V from a commercial power supply. The pattern conductors M1 and M2 are terminals that receive alternating current. The diode bridge DB rectifies the received alternating current, and a pulsating current is output to the pattern conductors M3 and M4. The pulsating current that is output to the pattern conductors M3 and M4 is a pulsating current obtained through full-wave rectification. The capacitor C1 smooths the pulsating current obtained from the diode bridge DB. The field-effect transistor FET switches the direct current obtained through smoothing performed by the capacitor C1. A high-frequency alternating current generated through switching using the field-effect transistor FET is output to the pattern conductors M3 and M5.

Accordingly, any configuration of the primary winding P may be employed as long as the winding P1 and the winding P2 are connected to each other in parallel and the primary winding P is connected to the pattern conductor M3 and the pattern conductor M5.

The pattern conductor M3 extends so that the pin #1 (end portion P11) of the transformer TF is connected to the pin #3 (end portion P21) of the transformer TF. The pattern conductor M5 connects the pin #2 (end portion P12) of the transformer TF to the pin #4 (end portion P22) of the transformer TF. That is, in the primary winding P, the pattern conductor M3 connects the end portion P11 of the winding P1 to the end portion P21 of the winding P2, and the pattern conductor M5 connects the end portion P12 of the winding P1 to the end portion P22 of the winding P2. In this manner, the winding P1 is connected to the winding P2 in parallel (see FIG. 3A). In this case, it is necessary to connect the end portion P11 to the end portion P21 and connect the end portion P12 to the end portion P22. However, the end portion P12 is present between the end portion P11 and the end portion P21, and the end portion P21 is present between the end portion P12 and the end portion P22. Therefore, it is necessary for one of the pattern conductor M3 and the pattern conductor M5 to extend on the secondary circuit Sc side of the pins #1 to #7. Therefore, in the first exemplary embodiment, in the power supply unit 70 of the low-voltage system (100 V) illustrated in FIG. 3A, the distance d1 between the pattern conductor M3 of the primary circuit Pc1 and a pattern conductor M31 of the secondary circuit Sc is shorter than the distance d2 between pattern conductors M6, M7, and M8 of the primary circuit Pc1 and pattern conductors M31 and M32 of the secondary circuit Sc in the power supply unit 70 of the high-voltage system (200 V) illustrated in FIG. 3B.

One end (the end portion P11 and the end portion P21) of the parallel connection between the winding P1 and the winding P2 is connected to the pattern conductor M3, and the other end (the end portion P12 and the end portion P22) is connected to the pattern conductor M5.

The high-frequency alternating current generated through switching using the field-effect transistor FET flows through the winding P1 and the winding P2 that are connected to each other in parallel in the primary winding P, which induces a high-frequency alternating current to the primary winding P3 and the secondary winding S1.

The secondary circuit Sc will be described.

The secondary circuit Sc is formed by using pattern conductors M31, M32, and M33 of the power supply substrate 71. The secondary circuit Sc includes the diode D2 disposed between the pattern conductors M32 and M33. The secondary circuit Sc also includes the capacitor C2 disposed between the pattern conductors M31 and M33.

The secondary winding S1 induces a high-frequency alternating current in the pattern conductors M31 and M32. Then, the high-frequency alternating current is rectified by the diode D2, and is converted into a pulsating current. The pulsating current obtained through rectification performed by the diode D2 is a pulsating current obtained through half-wave rectification. The pulsating current obtained through rectification performed by the diode D2 is smoothed by the capacitor C2. The smoothed direct current is output from the pattern conductors M31 and M33. The pattern conductors M31 and M33 are terminals that output a direct current of 24 V.

The primary circuit Pc2 will be described.

The primary circuit Pc2 is formed by using pattern conductors M41, M42, and M43 of the power supply substrate 71. The primary circuit Pc2 includes the diode D3 disposed between the pattern conductors M42 and M43. The primary circuit Pc2 also includes the capacitor C3 disposed between the pattern conductors M41 and M43.

The primary winding P3 induces a high-frequency alternating current in the pattern conductors M41 and M42. Then, the high-frequency alternating current is rectified by the diode D3, and is converted into a pulsating current. The pulsating current obtained through rectification performed by the diode D3 is a pulsating current obtained through half-wave rectification. The capacitor C3 smooths the pulsating current obtained through rectification performed by the diode D3. The smoothed direct current is output from the pattern conductors M41 and M43. The pattern conductors M41 and M43 are terminals that output a voltage supplied to a control circuit Cc for the field-effect transistor FET, and outputs, for example, a direct current of 20 V.

The control circuit Cc generates a signal for switching the field-effect transistor FET, and controls the field-effect transistor FET.

As described above, in the power supply unit 70 of the low-voltage system (in this example, 100 V), the winding P1 and the winding P2 in the primary winding P are connected to each other in parallel.

By using FIG. 3B, the primary circuits Pc1 and Pc2 and the secondary circuit Sc in the high-voltage system (200 V) will be described. The primary circuit Pc2 and the secondary circuit Sc are the same as those in the power supply unit 70 of the low-voltage system (100 V), and will not be described.

The primary circuit Pc1 is formed by using the pattern conductors M1, M2, M4, M6, M7, and M8 of the power supply substrate 71. The pattern conductors M1, M2, and M4 are the same as those in the low-voltage system in FIG. 3A. The primary circuit Pc1 includes the diode bridge DB disposed among the pattern conductors M1, M2, M4, and M6. The primary circuit Pc1 also includes the capacitor C1 disposed between the pattern conductors M4 and M6. The primary circuit Pc1 also includes the field-effect transistor FET disposed between the pattern conductors M4 and M7.

The pattern conductors M1 and M2 receive an alternating current of 200 V from a commercial power supply. The pattern conductors M1 and M2 are terminals that receive alternating current. Then, the diode bridge DB rectifies the received alternating current, and a pulsating current is output to the pattern conductors M4 and M6. The capacitor C1 smooths the pulsating current obtained from the diode bridge DB. The field-effect transistor FET switches the direct current obtained through smoothing performed by the capacitor C1. The high-frequency alternating current generated through switching using the field-effect transistor FET is output to the pattern conductors M6 and M7.

Accordingly, any configuration of the primary winding P may be employed as long as the winding P1 is connected to the winding P2 in series and the primary winding P is connected to the pattern conductor M6 and the pattern conductor M7.

The pattern conductor M6 extends so as to be connected to the pin #1 (end portion P11) of the transformer TF. The pattern conductor M7 is connected to the pin #4 (end portion P22) of the transformer TF. The pattern conductor M8 connects the pin #2 (end portion P12) of the transformer TF to the pin #3 (end portion P21) of the transformer TF. That is, in the primary winding P, the pattern conductor M8 connects the end portion P12 of the winding P1 to the end portion P21 of the winding P2. In this manner, the winding P1 is connected to the winding P2 in series (see FIG. 2B).

One end (the end portion P11 of the winding P1) of the series connection between the winding P1 and the winding P2 is connected to the pattern conductor M6, and the other end (the end portion P22 of the winding P2) is connected to the pattern conductor M7.

Accordingly, the high-frequency alternating current generated through switching using the field-effect transistor FET flows through the winding P1 and the winding P2 that are connected to each other in series in the primary winding P, which induces a high-frequency alternating current in the secondary winding S1.

As described above, many components included in the transformer TF are commonly used in the low-voltage power supply unit 70 and the high-voltage power supply unit 70. Connection between the winding P1 and the winding P2 (parallel connection or series connection) is set by using the pattern conductors M disposed on the power supply substrate 71. That is, the power supply substrate 71 having the pattern conductors M that are different in the low-voltage power supply unit 70 and in the high-voltage power supply unit 70 is prepared, achieving common use of many components included in the transformer TF.

Second Exemplary Embodiment

In the first exemplary embodiment, the power supply substrate 71 having the pattern conductors M that are different in the low-voltage system and the high-voltage system is used.

In a second exemplary embodiment, the power supply substrate 71 having the pattern conductors M that are the same in the low-voltage system and the high-voltage system is used. That is, in the second exemplary embodiment, the power supply substrate 71 and many components included in the transformer TF are commonly used in the low-voltage system and the high-voltage system.

Figure 4A:
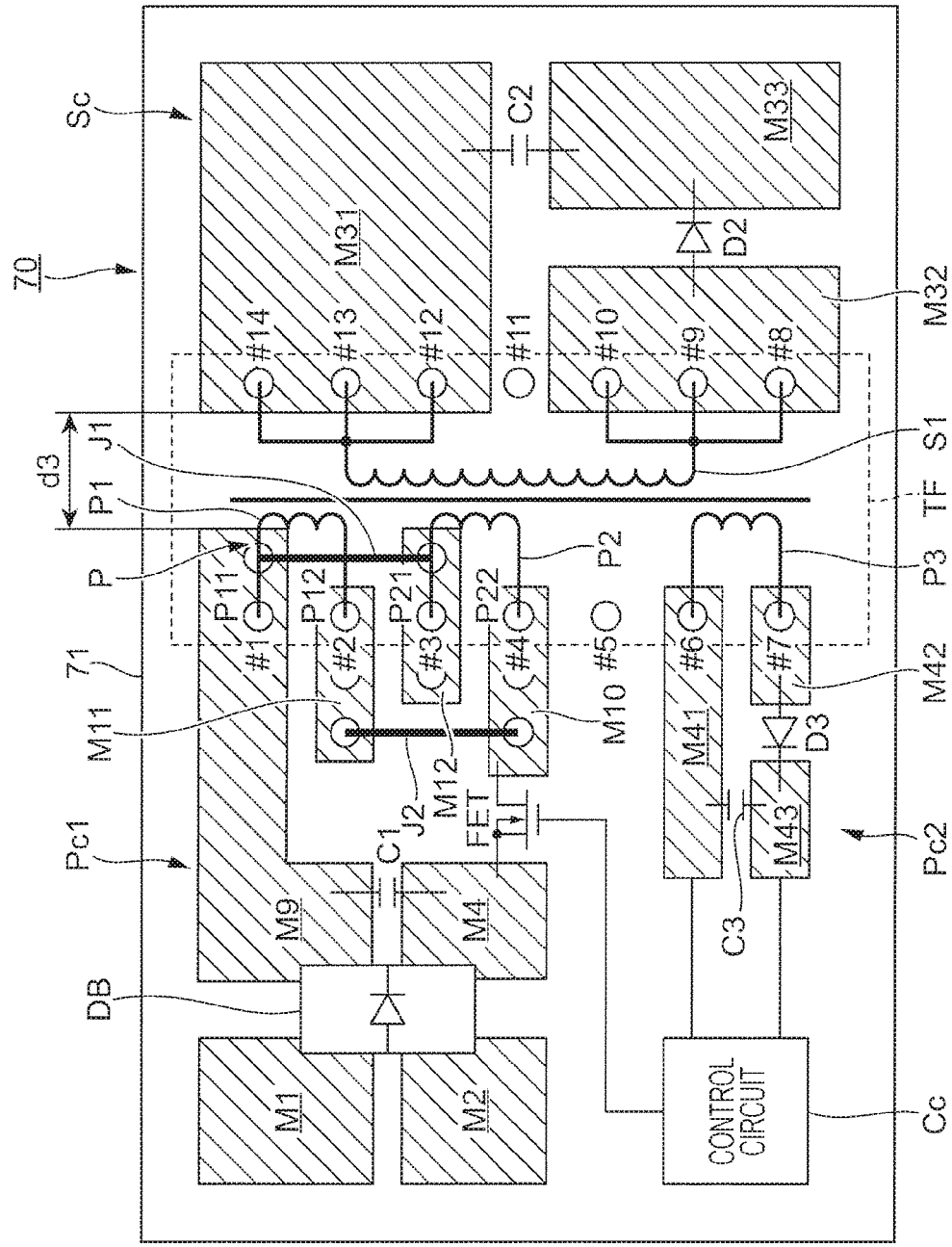
FIG. 4A is a diagram illustrating an exemplary configuration of a low-voltage power supply unit to which a second exemplary embodiment is applied.
Figure 4B:
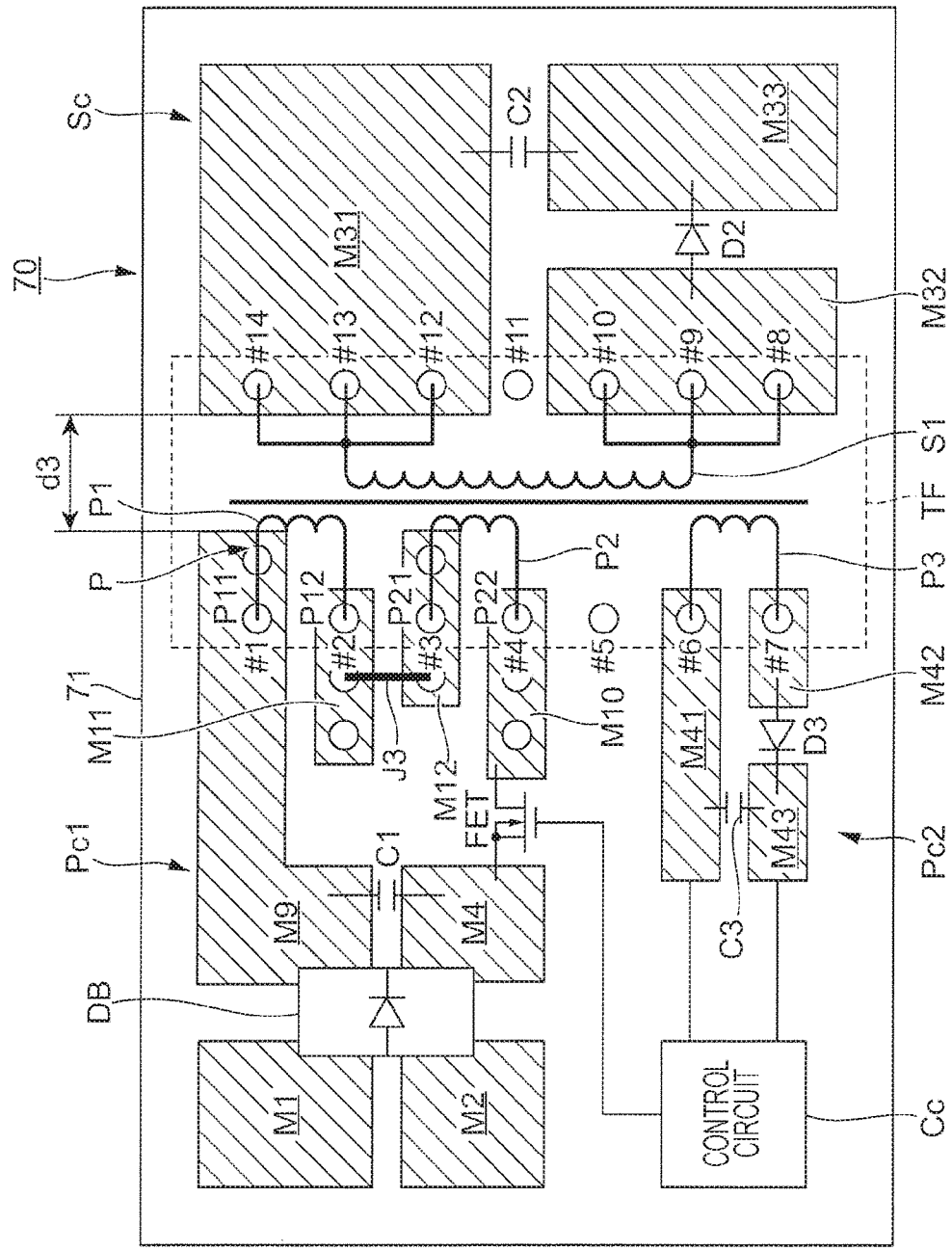
FIG. 4B is a diagram illustrating an exemplary configuration of a high-voltage power supply unit to which the second exemplary embodiment is applied.

FIGS. 4A and 4B illustrate exemplary configurations of the power supply unit 70 to which the second exemplary embodiment is applied. FIG. 4A illustrates a low-voltage power supply unit 70, and FIG. 4B illustrates a high-voltage power supply unit 70. A description will be made under the assumption that the low-voltage system is a system for alternating current of 100 V and the high-voltage system is a system for alternating current of 200 V. Components that are substantially identical to components of the power supply unit 70 to which the first exemplary embodiment is applied are designated with identical reference characters, and will not be described. The transformer TF is substantially the same as the transformer TF in the first exemplary embodiment. The primary circuit Pc2 and the secondary circuit Sc are substantially the same as the primary circuit Pc2 and the secondary circuit Sc in the first exemplary embodiment. Accordingly, the primary circuit Pc1 which is different from the primary circuit Pc1 in the first exemplary embodiment will be described.

By using FIG. 4A, the primary circuit Pc1 in the power supply unit 70 of the low-voltage system (100 V) will be described.

The primary circuit Pc1 is formed by using pattern conductors M1, M2, M4, M9, M10, M11, and M12 of the power supply substrate 71. The primary circuit Pc1 includes connection members J1 and J2. The primary circuit Pc1 also includes the diode bridge DB disposed among the pattern conductors M1, M2, M4, and M9. The primary circuit Pc1 also includes the capacitor C1 disposed between the pattern conductors M4 and M9. The primary circuit Pc1 also includes the field-effect transistor FET disposed between the pattern conductors M4 and M10.

The connection members J1 and J2 are, for example, shorting bars that are members formed of a metallic material which is electrically conductive and that are inserted into two holes provided in advance in the power supply substrate 71 so as to electrically connect the holes to each other. The connection members J1 and J2 may be jumper wires. Further, the connection members J1 and J2 may be members that are formed as a filter having inductance (L) and resistance (R) and that suppress propagation (passing) of high-frequency noise generated in accordance with the on/off state of the field-effect transistor FET. The same is true for other connection members J described below.

Operations performed by the primary circuit Pc1 are the same as the operations in the first exemplary embodiment. That is, the high-frequency alternating current generated through switching using the field-effect transistor FET is output to the pattern conductors M9 and M10.

Accordingly, any configuration of the primary winding P may be employed as long as the winding P1 is connected to the winding P2 in parallel and the primary winding P is connected to the pattern conductor M9 and the pattern conductor M10.

The pattern conductor M9 extends so as to be connected to the pin #1 (end portion P11) of the transformer TF. The pattern conductor M10 extends so as to be connected to the pin #4 (end portion P22) of the transformer TF. The pattern conductor M11 is connected to the pin #2 (end portion P12) of the transformer TF. The pattern conductor M12 is connected to the pin #3 (end portion P21) of the transformer TF.

The connection member J1 connects the pattern conductor M9 (end portion P11) to the pattern conductor M12 (end portion P21). The connection member J2 connects the pattern conductor M10 (end portion P22) to the pattern conductor M11 (end portion P12).

That is, in the primary winding P, the connection member J1 connects the end portion P11 of the winding P1 to the end portion P21 of the winding P2, and the connection member J2 connects the end portion P12 of the winding P1 to the end portion P22 of the winding P2. Thus, the winding P1 is connected to the winding P2 in parallel (see FIG. 2A).

One end (the end portion P11 and the end portion P21) of the parallel connection between the winding P1 and the winding P2 is connected to the pattern conductor M9, and the other end (the end portion P12 and the end portion P22) is connected to the pattern conductor M10.

The high-frequency alternating current generated through switching using the field-effect transistor FET flows through the winding P1 and the winding P2 in the primary winding P that are connected to each other in parallel, which induces a high-frequency alternating current to the secondary winding S1.

In FIG. 4A, the connection member J1 underlies the transformer TF. In this case, before the transformer TF is mounted, the connection member J1 may be mounted on the power supply substrate 71.

By using FIG. 4B, the primary circuit Pc1 in the power supply unit 70 of the high-voltage system (200 V) will be described.

The primary circuit Pc1 includes a connection member J3 instead of the connection members J1 and J2 in the power supply unit 70 of the low-voltage system (100 V) illustrated in FIG. 4A. The other components are substantially the same as components of the power supply unit 70 of the low-voltage system (100 V), and will not be described.

Similarly to the description about the first exemplary embodiment, in the power supply unit 70 of the high-voltage system (200 V), the high-frequency alternating current generated through switching using the field-effect transistor FET is output to the pattern conductors M9 and M10.

Accordingly, any configuration of the primary winding P may be employed as long as the winding P1 is connected to the winding P2 in series and the primary winding P is connected to the pattern conductor M9 and the pattern conductor M10.

The connection member J3 connects the pattern conductor M11 (end portion P12) to the pattern conductor M12 (end portion P21).

Thus, the end portion P12 of the winding P1 is connected to the end portion P21 of the winding P2 in the primary winding P, and the winding P1 is connected to the winding P2 in series (see FIG. 2B).

One end (end portion P11) of the series connection between the winding P1 and the winding P2 is connected to the pattern conductor M9, and the other end (end portion P22) is connected to the pattern conductor M10.

Accordingly, the high-frequency alternating current generated through switching using the field-effect transistor FET flows through the winding P1 and the winding P2 that are connected to each other in series in the primary winding P, which induces a high-frequency alternating current to the secondary winding S1.

As described above, in the second exemplary embodiment, the power supply substrate 71 and many components included in the transformer TF are commonly used in the low-voltage power supply unit 70 and the high-voltage power supply unit 70. The connection members J1, J2, and J3 are used to set a connection relationship (parallel connection or series connection) between the winding P1 and the winding P2 in the primary winding P. In the second exemplary embodiment, the power supply substrate 71 is easily managed.

Third Exemplary Embodiment

In the first exemplary embodiment, the distance d1 between the pattern conductor M3 of the primary circuit Pc1 and the pattern conductor M31 of the secondary circuit Sc in the power supply unit 70 of the low-voltage system (100 V) illustrated in FIG. 3A is shorter than the distance d2 between the pattern conductors M6, M7, and M8 of the primary circuit Pc1 and the pattern conductors M31 and M32 of the secondary circuit Sc in the power supply unit 70 of the high-voltage system (200 V) illustrated in FIG. 3B.

Also in the second exemplary embodiment, as illustrated in FIGS. 4A and 4B, when the distance between the pin #1 and the pin #14 is the same in the first exemplary embodiment and the second exemplary embodiment, the distance d3 between the pattern conductors M9 and M12 of the primary circuit Pc1 and the pattern conductor M31 of the secondary circuit Sc is shorter than the distance d2 in the power supply unit 70 of the high-voltage system (200 V) according to the first exemplary embodiment illustrated in FIG. 3B. Therefore, the electric field in this portion is high.

Therefore, in the third exemplary embodiment, in both of the power supply unit 70 of the low-voltage system (100 V) and the power supply unit 70 of the high-voltage system (200 V), the distance between the pattern conductors M of the primary circuit Pc1 and the pattern conductors M of the secondary circuit Sc is set to the distance d2. Since the distance between the pattern conductors M of the primary circuit Pc1 and the pattern conductors M of the secondary circuit Sc is determined according to a safety standard, it is necessary to keep a necessary and sufficient distance. Accordingly, if the distance d1 and the distance d3 are equal to the distance d2, the size of the apparatus is increased.

Figure 5A:
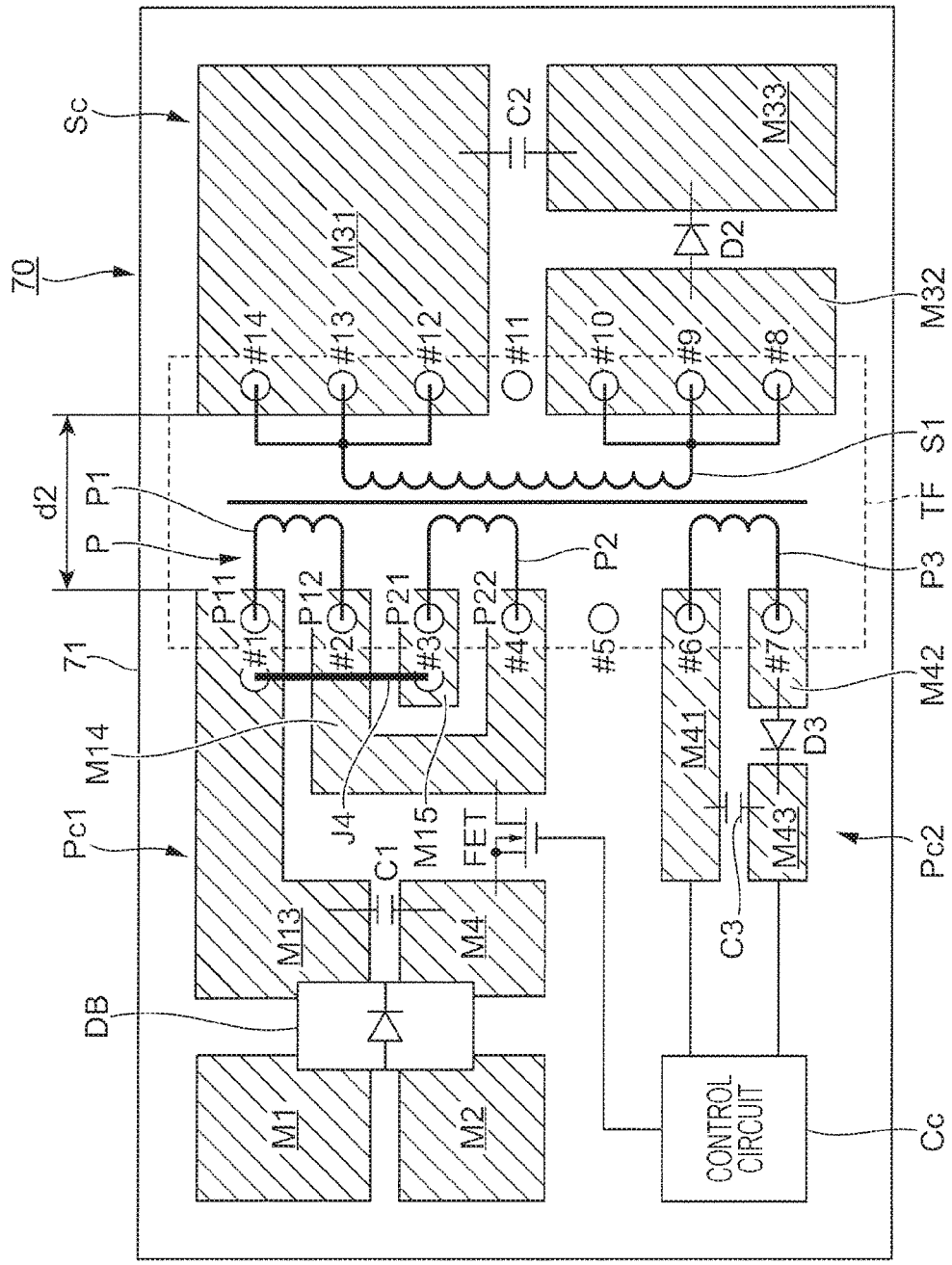
FIG. 5A is a diagram illustrating an exemplary configuration of a low-voltage power supply unit to which a third exemplary embodiment is applied.
Figure 5B:
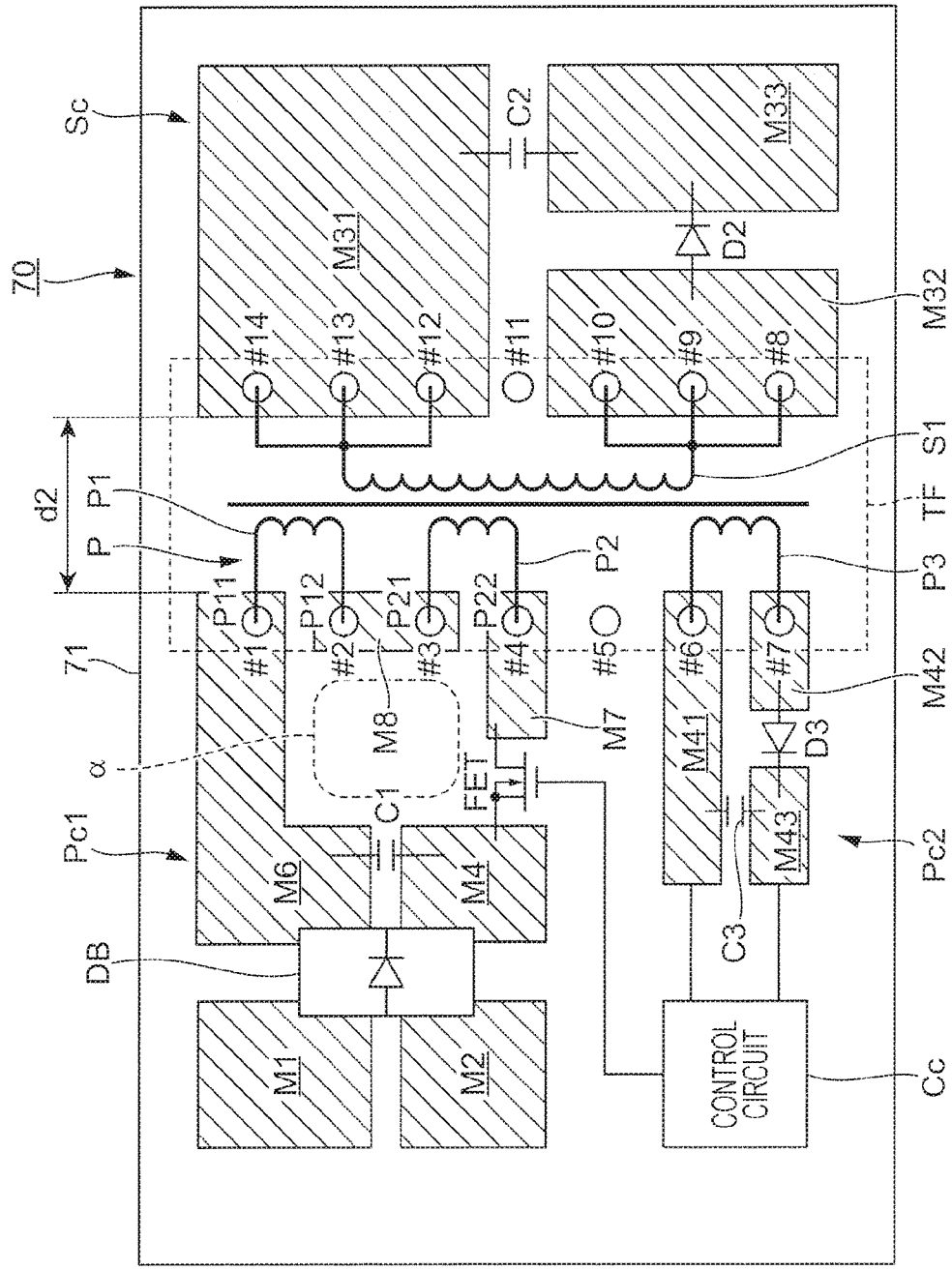
FIG. 5B is a diagram illustrating an exemplary configuration of a high-voltage power supply unit to which the third exemplary embodiment is applied.

FIGS. 5A and 5B illustrate exemplary configurations of the power supply unit 70 to which a third exemplary embodiment is applied. FIG. 5A illustrates a low-voltage power supply unit 70, and FIG. 5B illustrates a high-voltage power supply unit 70. A description will be made under the assumption that the low-voltage system is a system for alternating current of 100 V, and the high-voltage system is a system for alternating current of 200 V. Components substantially identical to components in power supply unit 70 to which the first exemplary embodiment and the second exemplary embodiment are applied are designated with identical reference characters, and will not be described. The transformer TF is substantially the same as the transformer TF in the first exemplary embodiment. The primary circuit Pc2 and the secondary circuit Sc are substantially the same as the primary circuit Pc2 and the secondary circuit Sc in the first exemplary embodiment. The primary circuit Pc1 that is different from the primary circuit Pc1 in the first exemplary embodiment will be described.

By using FIG. 5A, the primary circuit Pc1 in the power supply unit 70 of the low-voltage system (100 V) will be described.

The primary circuit Pc1 is formed by using pattern conductors M1, M2, M4, M13, M14, and M15 of the power supply substrate 71. The primary circuit Pc1 includes a connection member J4. The primary circuit Pc1 also includes the diode bridge DB disposed among the pattern conductors M1, M2, M4, and M13. The primary circuit Pc1 also includes the capacitor C1 disposed between the pattern conductors M4 and M13. The primary circuit Pc1 also includes the field-effect transistor FET disposed between the pattern conductors M4 and M14.

Operations performed by the primary circuit Pc1 are the same as the operations in the first exemplary embodiment. That is, the high-frequency alternating current generated through switching using the field-effect transistor FET is output to the pattern conductors M13 and M14.

Any configuration of the primary winding P may be employed as long as the winding P1 is connected to the winding P2 in parallel and the primary winding P is connected to the pattern conductors M13 and M14.

The pattern conductor M13 extends so as to be connected to the pin #1 (end portion P11) of the transformer TF. The pattern conductor M14 is disposed so as to connect the pin #2 (end portion P12) of the transformer TF to the pin #4 (end portion P22) of the transformer TF. The pattern conductor M15 is connected to the pin #3 (end portion P21) of the transformer TF.

The connection member J4 connects the pattern conductor M13 (end portion P11) to the pattern conductor M15 (end portion P21).

That is, in the primary winding P, the connection member J4 connects the end portion P11 of the winding P1 to the end portion P21 of the winding P2, and the pattern conductor M14 connects the end portion P12 of the winding P1 to the end portion P22 of the winding P2. The pattern conductor M14 is disposed so as to detour around the pattern conductor M15 on the primary circuit Pc side, and connects the end portion P12 to the end portion P22. Thus, the winding P1 is connected to the winding P2 in parallel (see FIG. 2A). The pattern conductor M14 may be called a connection pattern conductor.

One end (the end portion P11 and the end portion P21) of the parallel connection between the winding P1 and the winding P2 is connected to the pattern conductor M13, and the other end (the end portion P12 and the end portion P22) is connected to the pattern conductor M14.

Therefore, the high-frequency alternating current generated through switching using the field-effect transistor FET flows through the winding P1 and the winding P2 that are connected in parallel in the primary winding P, which induces a high-frequency alternating current to the secondary winding S1.

As illustrated in FIG. 5A, the connection member J4 connects the pin #1 (end portion P11) of the transformer TF to the pin #3 (end portion P21) of the transformer TF, and the pattern conductor M14 connects the pin #2 (end portion P12) to the pin #4 (end portion P22). Thus, the distance between the pattern conductors M13, M14, and M15 of the primary circuit Pc1 and the pattern conductor M31 of the secondary circuit Sc is set to the distance d2.

The primary circuit Pc1 in the power supply unit 70 of the high-voltage system (200 V) illustrated in FIG. 5B is the same as that in the power supply unit 70 of the high-voltage system (200 V) in the first exemplary embodiment illustrated in FIG. 3B. As described above, the distance between the pattern conductors M6, M7, and M8 of the primary circuit Pc1 and the pattern conductors M31 and M32 of the secondary circuit Sc in the power supply unit 70 of the high-voltage system (200 V) illustrated in FIG. 3B is set to the distance d2.

Fourth Exemplary Embodiment

The power supply unit 70 to which a fourth exemplary embodiment is applied is smaller than the power supply units 70 in the first to third exemplary embodiments. That is, the size of the power supply substrate 71 is smaller.

For example, in the power supply unit 70 according to the first exemplary embodiment, in connection between the end portion P12 and the end portion P22 in the low-voltage power supply unit 70 illustrated in FIG. 3A, the end portion P21 is interposed between the end portion P12 and the end portion P22. Therefore, the pattern conductor M5 is provided. Accordingly, when the power supply substrate 71 having the same size is used, a region a (a region surrounded by the pattern conductors M4, M6, M7, and M8) is not used in the high-voltage power supply unit 70 illustrated in FIG. 3B, resulting in an increase in the size of the power supply substrate 71.

In the power supply unit 70 according to the third exemplary embodiment, in connection between the end portion P12 and the end portion P22 in the low-voltage power supply unit 70 illustrated in FIG. 5A, the end portion P21 is interposed between the end portion P12 and the end portion P22. Therefore, the pattern conductor M14 is provided. Accordingly, the region a (the region surrounded by the pattern conductors M4, M6, M7, and M8) illustrated in FIG. 5B is not used, resulting in an increase in the size of the power supply substrate 71.

Figure 6A:
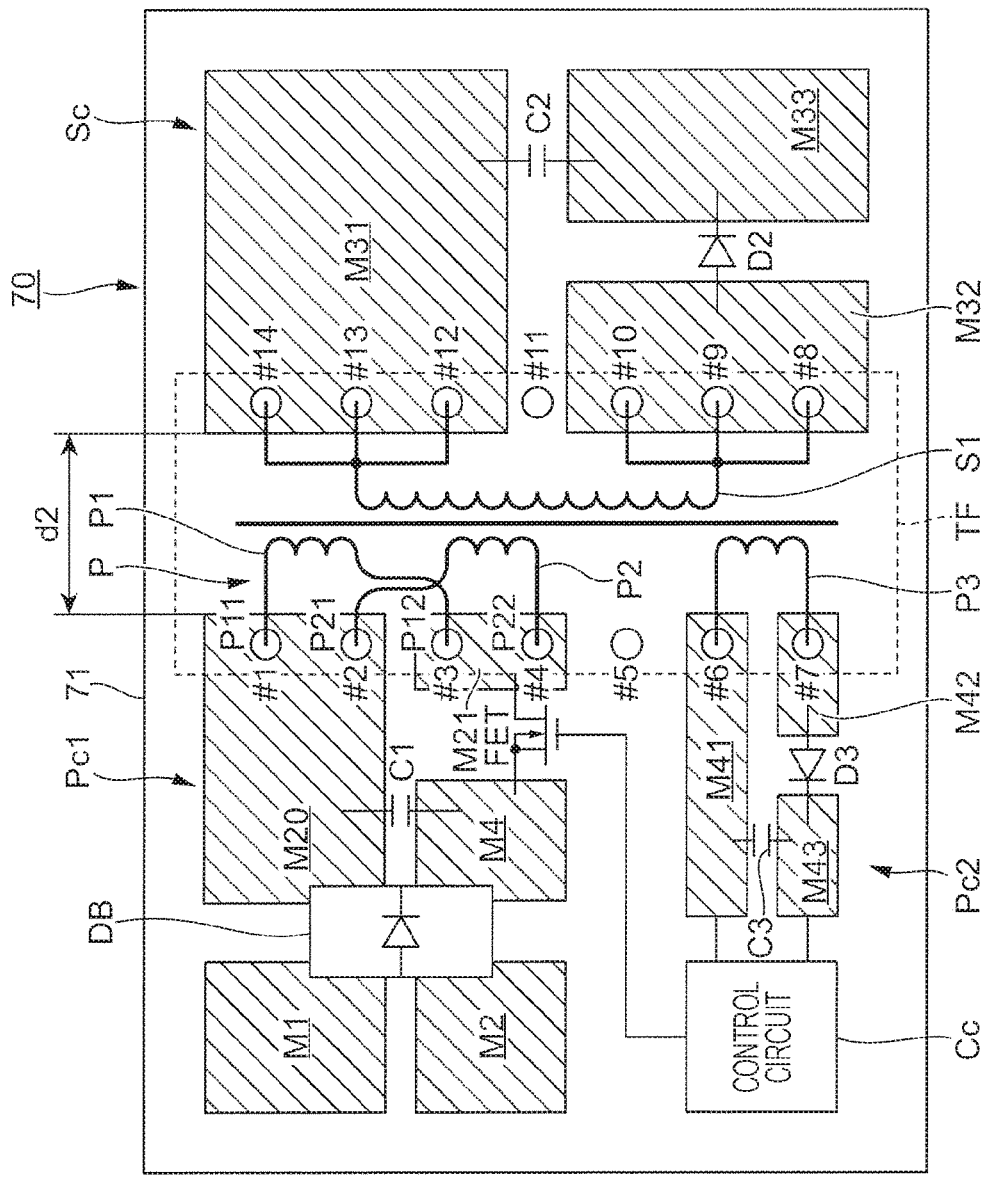
FIG. 6A is a diagram illustrating an exemplary configuration of a low-voltage power supply unit to which a fourth exemplary embodiment is applied.

FIGS. 6A and 6B illustrate exemplary configurations of the power supply unit 70 to which the fourth exemplary embodiment is applied. FIG. 6A illustrates a low-voltage power supply unit 70, and FIG. 6B illustrates a high-voltage power supply unit 70. A description will be made under the assumption that the low-voltage system is a system for alternating current of 100 V and that the high-voltage system is a system for alternating current of 200 V. Components substantially identical to components in the first exemplary embodiment are designated with identical reference characters, and will not be described.

The transformer TF will be described. As described above, the transformer TF is commonly used in the low-voltage power supply unit 70 (FIG. 6A) and the high-voltage power supply unit 70 (FIG. 6B).

The number and arrangement of pins (pins #1 to #14) of the transformer TF are the same as the number and arrangement in the first exemplary embodiment.

Similarly to the first and third exemplary embodiments, the transformer TF includes the primary winding P (windings P1 and P2) and the secondary winding S1. The connection relationship indicating how pins are connected to the windings P1 and P2 in the fourth exemplary embodiment is different from the connection relationship in the first and third exemplary embodiments.

In the winding P1, the end portion P11 is connected to the pin #1, and the end portion P12 is connected to the pin #3. In the winding P2, the end portion P21 is connected to the pin #2, and the end portion P22 is connected to the pin #4.

The winding S1 and the winding P3 are substantially the same as the winding S1 and the winding P3 in the first exemplary embodiment, and will not be described.

Nothing is connected to the pins #5 and #11.

The primary circuit Pc2 and the secondary circuit Sc are substantially the same as the primary circuit Pc2 and the secondary circuit Sc in the first exemplary embodiment. Accordingly, the primary circuit Pc1 will be described.

By using FIG. 6A, the primary circuit Pc1 in the power supply unit 70 of the low-voltage system (100 V) will be described.

The primary circuit Pc1 is formed by using pattern conductors M1, M2, M4, M20, and M21 of the power supply substrate 71. The primary circuit Pc1 includes the diode bridge DB disposed among the pattern conductors M1, M2, M4, and M20. The primary circuit Pc1 includes the capacitor C1 disposed between the pattern conductors M4 and M20. The primary circuit Pc1 includes the field-effect transistor FET disposed between the pattern conductors M4 and M21.

Operation of the primary circuit Pc1 are the same as the operations in the first exemplary embodiment. That is, the high-frequency alternating current generated through switching using the field-effect transistor FET is output to the pattern conductors M20 and M21.

Accordingly, any configuration of the primary winding P may be employed as long as the winding P1 is connected to the winding P2 in parallel and the primary winding P is connected to the pattern conductors M20 and M21.

The pattern conductor M20 extends so as to be connected to the pin #1 (end portion P11) and the pin #2 (end portion P21) of the transformer TF. The pattern conductor M21 is disposed so as to connect the pin #3 (end portion P12) of the transformer TF to the pin #4 (end portion P22) of the transformer TF.

That is, the pattern conductor M20 connects the end portion P11 of the winding P1 to the end portion P21 of the winding P2 in the primary winding P, and the pattern conductor M21 connects the end portion P12 of the winding P1 and the end portion P22 of the winding P2. Thus, the winding P1 is connected to the winding P2 in parallel (see FIG. 2A).

One end (the end portion P11 and the end portion P21) of the parallel connection between the winding P1 and the winding P2 is connected to the pattern conductor M20, and the other end (the end portion P12 and the end portion P22) is connected to the pattern conductor M21.

The connection relationship of pins in the winding P1 is different from the connection relationship in the winding P2. Thus, the distance between the pattern conductors M of the primary circuit Pc1 and the pattern conductors M of the secondary circuit Sc is set to the distance d2.

As described above, in the third exemplary embodiment, the distance between the pattern conductors M of the primary circuit Pc1 and the pattern conductors M of the secondary circuit Sc in the power supply unit 70 of the low-voltage system (100 V) illustrated in FIG. 5A is set to the distance d2. In the parallel connection between the winding P1 and the winding P2 in the primary winding P, connection is made by using the connection member J4 at one end (the end portion P11 and the end portion P21), and connection is made by using the pattern conductor M14 at the other end (the end portion P12 and the end portion P22). That is, electric characteristics at one end of the primary winding P and electric characteristics at the other end are asymmetrical (unbalanced).

In contrast, in the power supply unit 70 according to the fourth exemplary embodiment, as illustrated in FIG. 6A, connection is made by using the pattern conductor M20 at one end (the end portion P11 and the end portion P21), and connection is made by using the pattern conductor M21 at the other end (the end portion P12 and the end portion P22). Thus, electric characteristics at one end of the primary winding P and electric characteristics at the other end are not asymmetrical (balanced).

By using FIG. 6B, the primary circuit Pc1 in the power supply unit 70 of the high-voltage system (200 V) will be described.

The primary circuit Pc1 is formed by using pattern conductors M1, M2, M4, M22, M23, and M24 of the power supply substrate 71. The primary circuit Pc1 includes the diode bridge DB disposed among the pattern conductors M1, M2, M4, and M22. The primary circuit Pc1 includes the capacitor C1 disposed between the pattern conductors M4 and M22. The primary circuit Pc1 includes the field-effect transistor FET disposed between the pattern conductors M4 and M24.

Operations performed by the primary circuit Pc1 are the same as the operations in the first exemplary embodiment. That is, the high-frequency alternating current generated through switching using the field-effect transistor FET is output to the pattern conductors M22 and M24.

Accordingly, any configuration of the primary winding P may be employed as long as the winding P1 is connected to the winding P2 in series and the primary winding P is connected to the pattern conductors M22 and M24.

The pattern conductor M22 extends so as to be connected to the pin #1 (end portion P11) of the transformer TF. The pattern conductor M23 is disposed so as to connect the pin #2 (end portion P21) of the transformer TF to the pin #3 (end portion P12) of the transformer TF. The pattern conductor M24 is disposed so as to be connected to the pin #4 (end portion P22) of the transformer TF.

That is, the pattern conductor M23 connects the end portion P12 of the winding P1 to the end portion P21 of the winding P2 in the primary winding P. Thus, the winding P1 is connected to the winding P2 in series (see FIG. 2B).

One end (end portion P11) of the series connection between the winding P1 and the winding P2 is connected to the pattern conductor M22, and the other end (end portion P22) is connected to the pattern conductor M24.

Accordingly, the high-frequency alternating current generated through switching using the field-effect transistor FET flows through the winding P1 and the winding P2 that are connected to each other in series in the primary winding P, which induces a high-frequency alternating current to the secondary winding S1.

The connection relationship of pins in the winding P1 is different from the connection relationship in the winding P2 so that the distance between the pattern conductors M of the primary circuit Pc1 and the pattern conductors M of the secondary circuit Sc is set to the distance d2.

A region surrounded by the pattern conductors M4, M22, M23, and M24 is smaller than the regions a illustrated in FIGS. 3B and 5B.

As described above, in the fourth exemplary embodiment, the connection relationship indicating how pins are connected to the windings P1 and P2 of the primary winding P in the transformer TF is different from the connection relationship in the first exemplary embodiment. Thus, many components included in the transformer TF are commonly used, and the size of the power supply substrate 71 is smaller than the size in the first exemplary embodiment.

In the low-voltage power supply unit 70 and the high-voltage power supply unit 70, the distance between the pattern conductors M of the primary circuit Pc1 and the pattern conductors M of the secondary circuit Sc is set to the distance d2.

In addition, in the low-voltage power supply unit 70, the state in which electric characteristics at one end of the primary winding P and electric characteristics at the other end are asymmetrical is avoided.

Further, in the high-voltage system, the state in which pins (pattern conductors M) that produce a large potential difference are disposed adjacent to each other is avoided.

Furthermore, the shapes of pattern conductors M of the power supply substrate 71 of the low-voltage power supply unit 70 are different from the shapes for the high-voltage power supply unit 70. However, a connection member J does not need to be used.

Moreover, in both of the low-voltage system and the high-voltage system, the end portions connecting the winding P1 of the transformer TF to the winding P2 are disposed adjacent to each other.

Fifth Exemplary Embodiment

The power supply unit 70 to which the fourth exemplary embodiment is applied uses the power supply substrate 71 on which different pattern conductors M are used in the low-voltage power supply unit 70 and the high-voltage power supply unit 70.

The power supply unit 70 to which a fifth exemplary embodiment is applied uses the power supply substrates 71 on which the same pattern conductors M are used in the low-voltage power supply unit 70 and the high-voltage power supply unit 70.

Figure 7A:
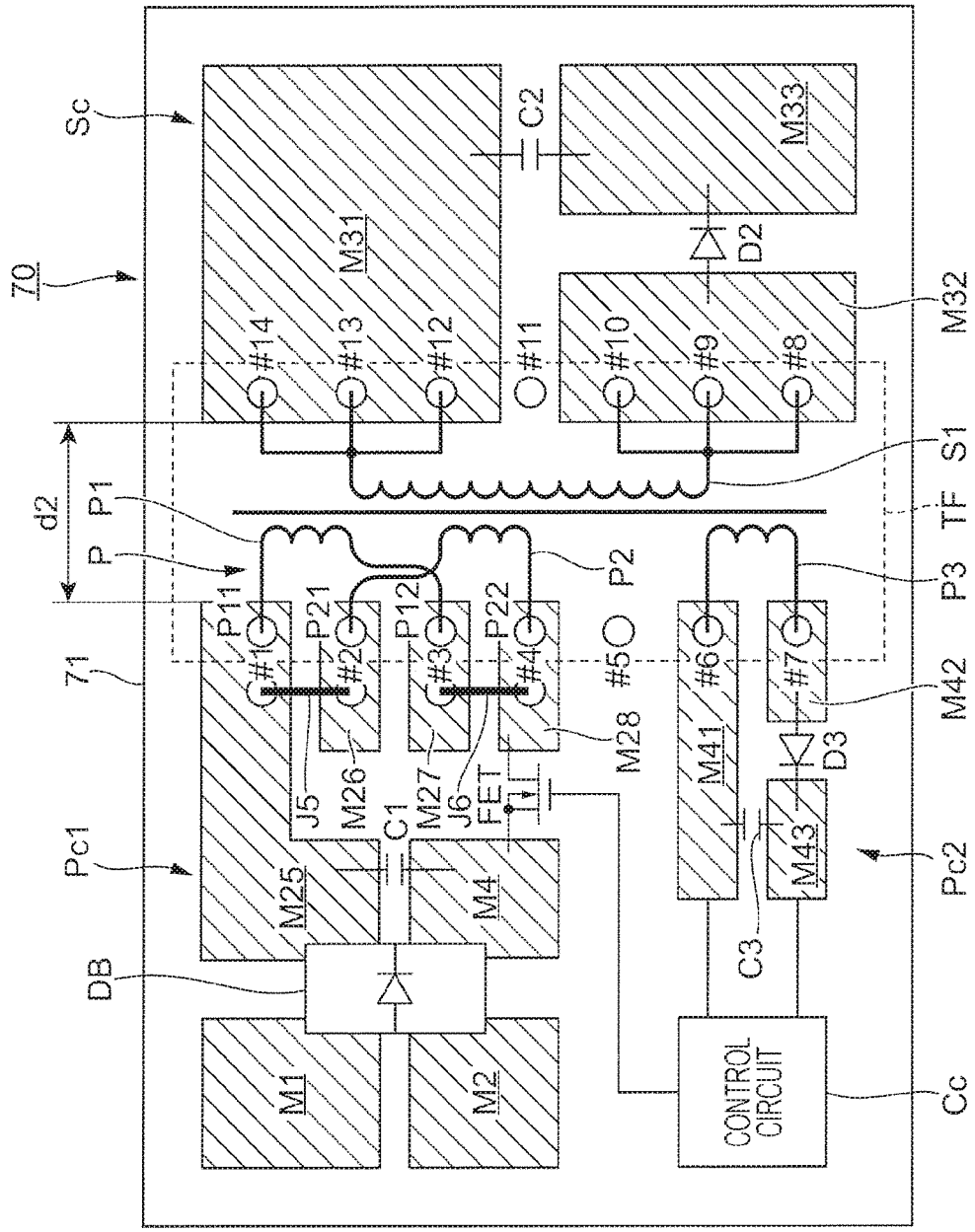
FIG. 7A is a diagram illustrating an exemplary configuration of a low-voltage power supply unit to which a fifth exemplary embodiment is applied.
Figure 7B:
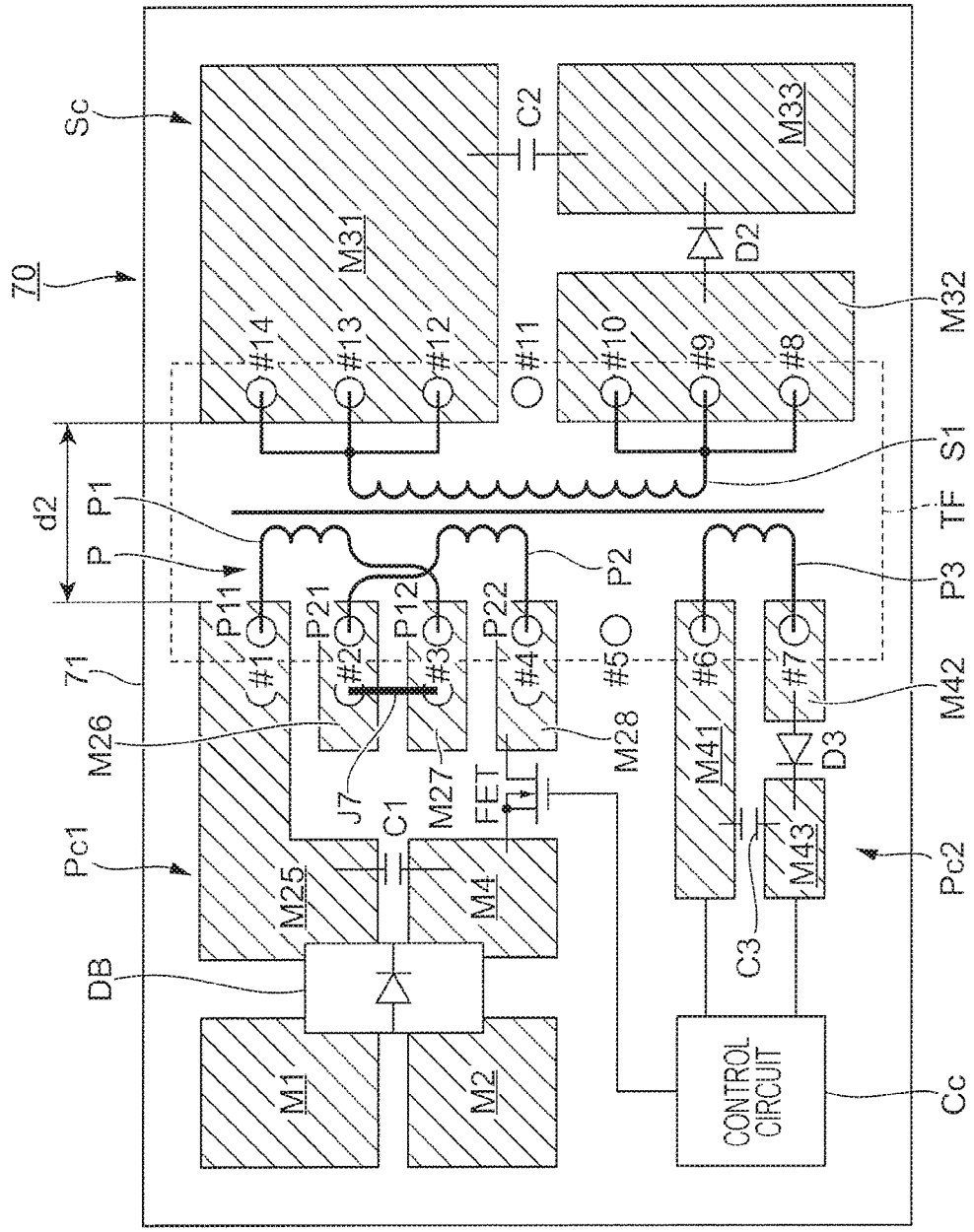
FIG. 7B is a diagram illustrating an exemplary configuration of a high-voltage power supply unit to which the fifth exemplary embodiment is applied.

FIGS. 7A and 7B illustrate exemplary configurations of the power supply unit 70 to which the fifth exemplary embodiment is applied. FIG. 7A illustrates a low-voltage power supply unit 70, and FIG. 7B illustrates a high-voltage power supply unit 70. A description will be made under the assumption that the low-voltage system is a system for alternating current of 100 V and that the high-voltage system is a system for alternating current of 200 V. Components substantially identical to components in the first exemplary embodiment are designated with identical reference characters, and will not be described.

The transformer TF is substantially the same as the transformer TF in the fourth exemplary embodiment, and will not be described.

The primary circuit Pc2 and the secondary circuit Sc are substantially the same as the primary circuit Pc2 and the secondary circuit Sc in the first exemplary embodiment. Accordingly, the primary circuit Pc1 that is different from the primary circuit Pc1 in the first exemplary embodiment will be described.

By using FIG. 7A, the primary circuit Pc1 in the power supply unit 70 of the low-voltage system (100 V) will be described.

The primary circuit Pc1 is formed by using pattern conductors M1, M2, M4, M25, M26, M27, and M28 of the power supply substrate 71. The primary circuit Pc1 includes connection members J5 and J6. The primary circuit Pc1 also includes the diode bridge DB disposed among the pattern conductors M1, M2, M4, and M25. The primary circuit Pc1 also includes the capacitor C1 disposed between the pattern conductors M4 and M25. The primary circuit Pc1 also includes the field-effect transistor FET disposed between the pattern conductors M4 and M28.

Operations performed by the primary circuit Pc1 are the same as the operations in the first exemplary embodiment. That is, the high-frequency alternating current generated through switching using the field-effect transistor FET is output to the pattern conductors M25 and M28.

Accordingly, any configuration of the primary winding P may be employed as long as the winding P1 is connected to the winding P2 in parallel and the primary winding P is connected to the pattern conductors M25 and M28.

The pattern conductor M25 extends so as to be connected to the pin #1 (end portion P11) of the transformer TF. The pattern conductor M26 is connected to the pin #2 (end portion P21) of the transformer TF. The pattern conductor M27 is connected to the pin #3 (end portion P12) of the transformer TF. The pattern conductor M28 is connected to the pin #4 (end portion P22) of the transformer TF.

The connection member J5 connects the pattern conductor M25 to the pattern conductor M26, and the connection member J6 connects the pattern conductor M27 to the pattern conductor M28.

That is, the connection member J5 connects the end portion P11 of the winding P1 to the end portion P21 of the winding P2 in the primary winding P, and the connection member J6 connects the end portion P12 of the winding P1 to the end portion P22 of the winding P2. Thus, the winding P1 is connected to the winding P2 in parallel (see FIG. 2A).

One end (the end portion P11 and the end portion P21) of the parallel connection between the winding P1 and the winding P2 is connected to the pattern conductor M25, and the other end (the end portion P12 and the end portion P22) is connected to the pattern conductor M28.

Accordingly, the high-frequency alternating current generated through switching using the field-effect transistor FET flows through the winding P1 and the winding P2 that are connected to each other in parallel in the primary winding P, which induces a high-frequency alternating current to the secondary winding S1.

The distance between the pattern conductors M of the primary circuit Pc1 and the pattern conductors M of the secondary circuit Sc is set to the distance d2.

Connection is made by using the connection member J5 at one end (the end portion P11 and the end portion P21) of the primary winding P, and connection is made by using the connection member J6 at the other end (the end portion P12 and the end portion P22). Accordingly, the state in which electric characteristics at one end of the primary winding P and electric characteristics at the other end are asymmetrical (unbalanced) is avoided.

A setting is made so that the difference in impedance between the connection member J5 and the connection member J6 is reduced. Thus, the state in which electric characteristics at one end of the primary winding P and electric characteristics at the other end are asymmetrical (unbalanced) is further avoided.

By using FIG. 7B, the primary circuit Pc1 in the power supply unit 70 of the high-voltage system (200 V) will be described.

The pattern conductors M1, M2, M4, M25, M26, M27, and M28 of the power supply substrate 71 of the primary circuit Pc1 are substantially the same as the pattern conductors M1, M2, M4, M25, M26, M27, and M28 of the power supply unit 70 of the low-voltage system (100 V) in FIG. 7A. The connection relationships of the diode bridge DB, the capacitor C1, and the field-effect transistor FET are the same as the connection relationships in FIG. 7A.

The primary circuit Pc1 includes a connection member J7 instead of the connection members J5 and J6 of the power supply unit 70 of the low-voltage system (100 V) in FIG. 7A.

Operations performed by the primary circuit Pc1 are the same as the operations in the first exemplary embodiment. That is, the high-frequency alternating current generated through switching using the field-effect transistor FET is output to the pattern conductors M25 and M28.

Accordingly, any configuration of the primary winding P may be employed as long as the winding P1 is connected to the winding P2 in series and the primary winding P is connected to the pattern conductors M25 and M28.

The connection member J7 connects the pattern conductor M26 to the pattern conductor M27.

That is, the connection member J7 connects the end portion P12 of the winding P1 to the end portion P21 of the winding P2 in the primary winding P. Thus, the winding P1 is connected to the winding P2 in series (see FIG. 2B).

One end (end portion P11) of the winding P in which series connection is made is connected to the pattern conductor M25, and the other end (end portion P22) is connected to the pattern conductor M28.

Accordingly, the high-frequency alternating current generated through switching using the field-effect transistor FET flows through the winding P1 and the winding P2 that are connected to each other in series in the primary winding P, which induces a high-frequency alternating current to the secondary winding S1.

Similarly to the fourth exemplary embodiment, in the power supply unit 70 of the high-voltage system (200 V) according to the fifth exemplary embodiment, the pin #1 (end portion P11) and the pin #4 (end portion P22) between which the potential difference is the largest are disposed apart with the pin #2 (end portion P21) and the pin #3 (end portion P12) that are at a midpoint potential and that are interposed between the pin #1 and the pin #4. Accordingly, a high electric field is unlikely to be produced between the pins and between the pattern conductors M connected to the pins.

As described above, in the fifth exemplary embodiment, many components included in the transformer TF are commonly used in the low-voltage power supply unit 70 and the high-voltage power supply unit 70. The power supply substrate 71 is also commonly used. Setting of the low-voltage power supply unit 70 and the high-voltage power supply unit 70 is made by using the connection members J.

The distance between the pattern conductors M of the primary circuit Pc1 and the pattern conductors M of the secondary circuit Sc is set to the distance d2 in the low-voltage power supply unit 70 and the high-voltage power supply unit 70.

In the low-voltage system, the state in which electric characteristics at one end of the primary winding P and electric characteristics at the other end are asymmetrical is avoided.

Further, in the high-voltage system, the state in which pins (pattern conductors M) between which the potential difference is large are disposed adjacent to each other is avoided.

Furthermore, in both of the low-voltage system and the high-voltage system, the end portions connecting the winding P1 and the winding P2 of the transformer TF are disposed adjacent to each other. The connecting end portions of the transformer TF are disposed adjacent to each other.

In the first to fifth exemplary embodiments, the state in which the winding P1 and the winding P2 are disposed in parallel in the primary winding P is described. The winding P1 and the winding P2 may be provided in any winding manner such as overlap winding. Any configuration may be employed as long as the terminals of the winding P1 and the winding P2 in the primary winding P are arranged as described in the first to fifth exemplary embodiments.

Various combinations and changes may be made without departing from the gist of the present invention.

What is claimed is:

1. A power supply unit comprising: a primary circuit that is connected to an alternating-current power supply and that includes a switching device;
   a transformer that includes a primary winding and a secondary winding, the primary winding receiving an alternating current in such a manner that the alternating current is induced in the secondary winding, the received alternating current being generated through switching using the switching device; and
   a secondary circuit that rectifies, for output, the alternating current induced in the secondary winding,
   wherein the primary winding includes a first winding and a second winding,
wherein the first winding is connected to the second winding in parallel in the primary winding,
wherein the primary circuit comprises:
a substrate; and
a first pattern conductor and a second pattern conductor formed on the substrate, wherein a first end of the first winding is connected to the first pattern conductor, wherein a second end of the first winding is connected to the second pattern conductor, wherein a first end of the second winding is connected to the first pattern conductor, and wherein a second end of the second winding is connected to the second pattern conductor;
a third pattern conductor and a fourth pattern conductor configured to receive the alternating current; and
a diode bridge connected to the first pattern conductor and the second pattern conductor and configured to rectify the received alternating current and generate a pulsating current, wherein the first pattern conductor and the second pattern are connected to the diode bridge and configured to receive the pulsating current.

2. The power supply unit according to claim 1,
   wherein the transformer includes a plurality of primary terminals that are arranged in line and that are connected to the primary winding.

3. The power supply unit according to claim 2,
   wherein the at least one connection member used in the parallel connection includes a plurality of connection members.

4. The power supply unit according to claim 3,
   wherein the at least one connection member is a jumper wire.

5. The power supply unit according to claim 3,
   wherein the at least one connection member is a member for suppressing propagation of noise.

6. The power supply unit according to claim 2,
   wherein the at least one connection member is a jumper wire.

7. The power supply unit according to claim 2,
   wherein the at least one connection member is a member for suppressing propagation of noise.

8. The power supply unit of claim 1, wherein the primary circuit further comprises:
   a smoothing capacitor connected between the first pattern conductor and the second pattern conductor and configured to smooth the pulsating current received from the diode bridge.

9. A power supply unit comprising:
   a primary circuit that is connected to an alternating-current power supply and that includes a switching device;
   a transformer that includes a primary winding and a secondary winding, the primary winding receiving an alternating current in such a manner that the alternating current is induced in the secondary winding, the received alternating current being generated through switching using the switching device; and
   a secondary circuit that rectifies, for output, the alternating current induced in the secondary winding,
   wherein the primary winding includes a first winding and a second winding,
   wherein, when the alternating-current power supply is a power supply of a first voltage, the first winding is connected to the second winding in parallel in the primary winding,
   wherein, when the alternating-current power supply is a power supply of a second voltage higher than the first voltage, the first winding is connected to the second winding in series in the primary winding,
   wherein the transformer includes a plurality of primary terminals that are arranged in line and that are connected to the primary winding,
   wherein, when the alternating-current power supply is the power supply of the first voltage, the plurality of primary terminals of the transformer are connected to one another by using first pattern conductors that are included in the primary circuit and that are disposed on a substrate on which the transformer is mounted, the connection of the plurality of primary terminals being made in such a manner that the first winding and the second winding in the primary winding of the transformer are connected to each other in parallel, wherein, when the alternating-current power supply is the power supply of the second voltage, the plurality of primary terminals of the transformer are connected to one another by using second pattern conductors that are included in the primary circuit and that are disposed on the substrate on which the transformer is mounted, the connection of the plurality of primary terminals being made in such a manner that the first winding and the second winding in the primary winding of the transformer are connected to each other in series, and wherein, the first pattern conductors connect the first winding and the second winding without changing position of the plurality of primary terminals which is connected for the second voltage.

10. The power supply unit according to claim 9, wherein the transformer includes a plurality of primary terminals that are arranged in line and that are connected to the primary winding.

11. The power supply unit according to claim 10, wherein the connection member is a jumper wire.

12. The power supply unit according to claim 10, wherein the connection member is a member for suppressing propagation of noise.

13. A power supply unit comprising: a primary circuit that is connected to an alternating-current power supply and that includes a switching device;
    a transformer that includes a primary winding and a secondary winding, the primary winding receiving an alternating current in such a manner that the alternating current is induced in the secondary winding, the received alternating current being generated through switching using the switching device; and
    a secondary circuit that rectifies, for output, the alternating current induced in the secondary winding, wherein the alternating-current power supply is a power supply of a 100 V system, wherein the primary winding includes a first winding and a second winding, and
wherein the first winding and the second winding in the primary winding are connected to each other in parallel,
wherein the primary circuit comprises:
a substrate; and
a first pattern conductor and a second pattern conductor formed on the substrate, wherein a first end of the first winding is connected to the first pattern conductor, wherein a second end of the first winding is connected to the second pattern conductor, wherein a first end of the second winding is connected to the first pattern conductor, and wherein a second end of the second winding is connected to the second pattern conductor;
a third pattern conductor and a fourth pattern conductor configured to receive the alternating current; and
a diode bridge connected to the first pattern conductor and the second pattern conductor and configured to rectify the received alternating current and generate a pulsating current, wherein the first pattern conductor and the second pattern are connected to the diode bridge and configured to receive the pulsating current.

14. The power supply unit according to claim 13, wherein the transformer includes a plurality of primary terminals that are arranged in line and that are connected to the primary winding.

15. The power supply unit of claim 13, wherein the primary circuit further comprises:
    a smoothing capacitor connected between the first pattern conductor and the second pattern conductor and configured to smooth the pulsating current received from the diode bridge.

16. A power supply unit comprising:
a substrate;
a first circuit and a second circuit formed on the substrate;
a transformer mounted on the substrate,
wherein the first circuit comprises:
    a first pattern conductor and a second pattern conductor configured to receive an alternating current;
    a diode bridge connected to the first pattern conductor and the second pattern conductor and configured to rectify the received alternating current and generate a pulsating current;
    a third pattern conductor and a fourth pattern connected to the diode bridge and configured to receive the pulsating current;
    a smoothing capacitor connected between the third pattern conductor and the fourth pattern conductor and configured to smooth the pulsating current received from the diode bridge;
    a fifth pattern conductor; and
    a switch connected between the fourth pattern conductor and the fifth pattern conductor,
wherein the second circuit comprises:
a sixth pattern conductor, a seventh pattern conductor and a eighth pattern conductor; and
a capacitor connected between the sixth pattern conductor and the eighth pattern conductor; and
a diode connected between the seventh pattern conductor and the eighth pattern conductor,
wherein the transformer comprises:
    a first primary winding and a second primary winding mounted in the first circuit, the first primary winding connected to the third pattern conductor and the fifth pattern conductor, and the second primary winding connected to the third pattern conductor and the fifth pattern conductor; and
    a secondary winding mounted in the second circuit in an area adjacent to the first primary wining and the second primary winding and connected to the sixth pattern conductor.

* * * * *